(12) United States Patent
Roberts et al.

(10) Patent No.: US 11,108,721 B1
(45) Date of Patent: Aug. 31, 2021

(54) SYSTEMS AND METHODS FOR MEDIA CONTENT COMMUNICATION

(71) Applicants: David Roberts, Cedar Hills, UT (US); Glenn Sugden, Windsor, CA (US)

(72) Inventors: David Roberts, Cedar Hills, UT (US); Glenn Sugden, Windsor, CA (US)

(*) Notice: Subject to any disclaimer, the term of this patent is extended or adjusted under 35 U.S.C. 154(b) by 0 days.

(21) Appl. No.: 16/854,847

(22) Filed: Apr. 21, 2020

(51) Int. Cl.
| | |
|---|---|
| *H04L 12/58* | (2006.01) |
| *G06F 9/451* | (2018.01) |
| *G06F 3/16* | (2006.01) |
| *H04M 1/72436* | (2021.01) |
| *H04L 29/06* | (2006.01) |
| *H04L 29/08* | (2006.01) |

(52) U.S. Cl.
CPC .............. *H04L 51/18* (2013.01); *G06F 3/167* (2013.01); *G06F 9/451* (2018.02); *H04L 51/04* (2013.01); *H04M 1/72436* (2021.01); *H04L 29/06027* (2013.01); *H04L 51/08* (2013.01); *H04L 65/602* (2013.01); *H04L 65/604* (2013.01); *H04L 67/04* (2013.01)

(58) Field of Classification Search
CPC ......... H04L 51/18; H04L 51/04; H04L 51/08; H04L 67/04; H04L 65/602; H04L 65/604; H04L 29/06027; G06F 9/451; G06F 3/167; H04M 1/72552
See application file for complete search history.

(56) References Cited

U.S. PATENT DOCUMENTS

| | | | |
|---|---|---|---|
| 6,977,921 B1 | 12/2005 | Dolan | |
| 7,203,648 B1* | 4/2007 | Ostermann | .......... G09B 21/009 |
| | | | 704/260 |
| 9,986,394 B1 | 5/2018 | Taylor et al. | |
| 10,614,607 B2* | 4/2020 | Tennant | ................ G06K 9/222 |
| 10,965,629 B1* | 3/2021 | Bekmambetov | ........ G06T 13/80 |

(Continued)

FOREIGN PATENT DOCUMENTS

| | | |
|---|---|---|
| CN | 105516945 | 4/2016 |
| EP | 2290972 | 3/2011 |

OTHER PUBLICATIONS

O'Reilly, Sending Voice Memos in a Text Message, accessed from: https://www.oreilly.com/library/view/the-iphone-book/9780133016529/ch03sec11lev11.html; Retrieved Feb. 3, 2020; 4 pages.

(Continued)

*Primary Examiner* — Justin R. Blaufeld
(74) *Attorney, Agent, or Firm* — Ray Quinney & Nebeker; Thomas L. Lingard

(57) ABSTRACT

The present disclosure relates to systems, non-transitory computer-readable media, and methods for communication using multiple media content items stored on both a sending device and a receiving device. In particular, in one or more embodiments, the disclosed systems receive an application package. The application generates a message from input text and matches a portion of the text input to an audio content item using mapping data. The application generates a message including the text input and an identifier to the audio content item. A receiving system receives an application package. The application receives the message and locates the audio content item on the application package using the identifier and presents the message, including the text and the audio content item.

20 Claims, 17 Drawing Sheets

(56) References Cited

U.S. PATENT DOCUMENTS

| | | | |
|---|---|---|---|
| 2002/0193996 A1* | 12/2002 | Squibbs | H04M 1/7243 704/260 |
| 2003/0110450 A1* | 6/2003 | Sakai | G06F 40/169 715/256 |
| 2004/0024822 A1* | 2/2004 | Werndorfer | G06F 3/0481 709/206 |
| 2004/0162878 A1* | 8/2004 | Lewis | H04L 29/06027 709/204 |
| 2004/0168055 A1* | 8/2004 | Lord | H04L 63/123 713/156 |
| 2005/0136955 A1 | 6/2005 | Mumick et al. | |
| 2005/0160149 A1* | 7/2005 | Durand | G06Q 10/107 709/206 |
| 2006/0059236 A1* | 3/2006 | Sheppard | H04L 51/04 709/206 |
| 2006/0189333 A1 | 8/2006 | Othmer | |
| 2008/0268817 A1 | 10/2008 | Anderl et al. | |
| 2011/0055675 A1* | 3/2011 | Sakai | G06F 40/109 715/200 |
| 2012/0162350 A1* | 6/2012 | Lee | H04L 51/10 348/14.03 |
| 2013/0038613 A1* | 2/2013 | Kim | G06T 3/0006 345/473 |
| 2013/0174052 A1* | 7/2013 | Blattner | H04L 51/04 715/752 |
| 2013/0310089 A1* | 11/2013 | Gianoukos | H04W 4/21 455/466 |
| 2014/0067397 A1* | 3/2014 | Radebaugh | G10L 13/08 704/260 |
| 2014/0163980 A1 | 6/2014 | Tesch et al. | |
| 2014/0237057 A1* | 8/2014 | Khodorenko | H04L 51/32 709/206 |
| 2015/0309720 A1* | 10/2015 | Fisher | G06F 3/04842 715/752 |
| 2015/0334075 A1* | 11/2015 | Wang | H04L 67/10 715/752 |
| 2016/0086620 A1 | 3/2016 | Ostermann et al. | |
| 2016/0092447 A1 | 3/2016 | Venkataraman et al. | |
| 2016/0373388 A1* | 12/2016 | Katis | H04W 4/50 |
| 2018/0061402 A1 | 3/2018 | Devaraj et al. | |
| 2019/0037267 A1 | 1/2019 | Gharaat et al. | |
| 2019/0057677 A1 | 2/2019 | Elson | |

OTHER PUBLICATIONS

International Search Report and Written Opinion for PCT/US2021/028289, dated Jul. 16, 2021, 11 pages.

* cited by examiner

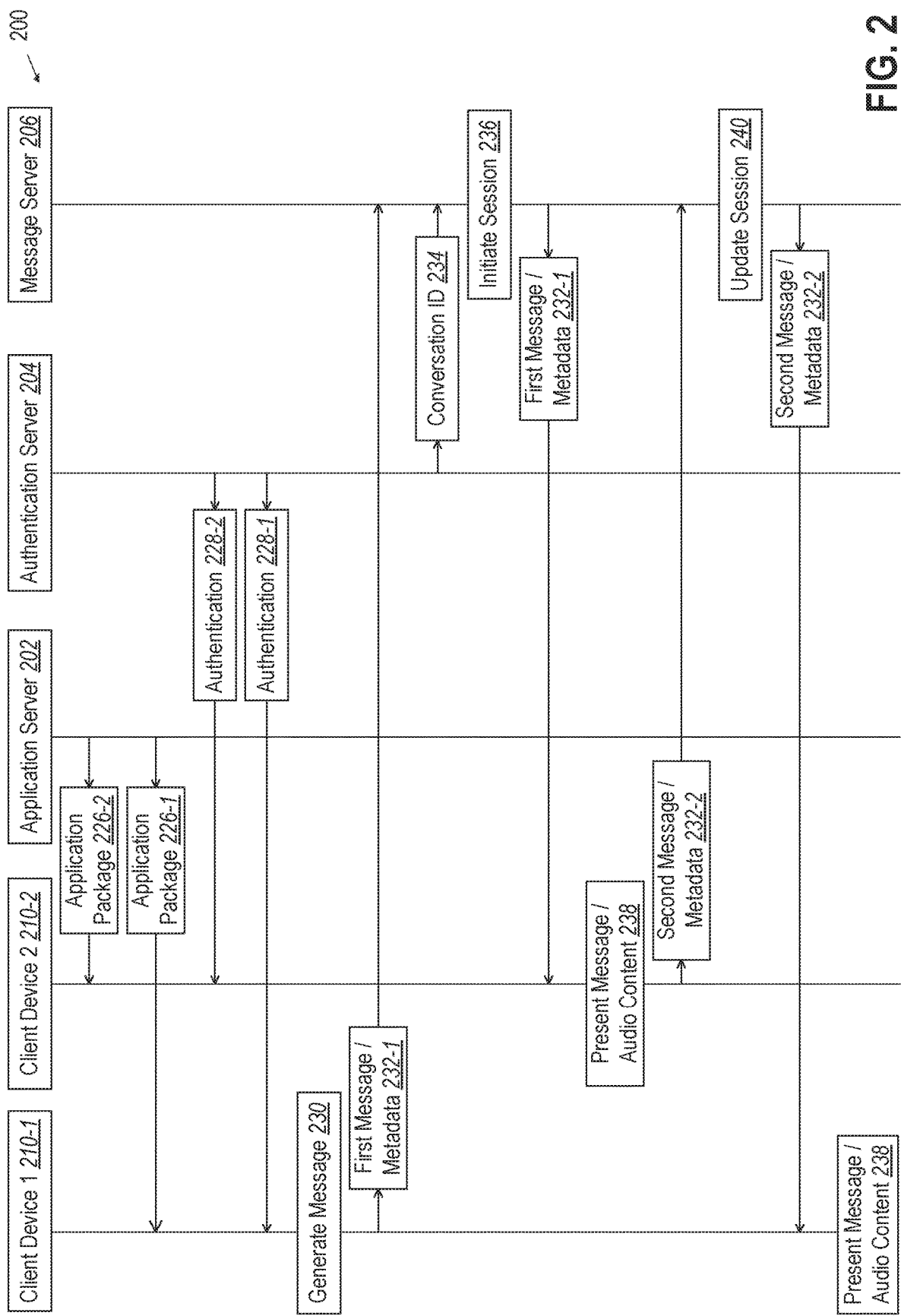

SYSTEMS AND METHODS FOR MEDIA CONTENT COMMUNICATION

BACKGROUND

Recent years have seen significant improvements in wireless communication and messaging services. As technology has advanced, communication systems have similarly advanced in providing more complex and advanced methods for communicating between two or more computing devices. For example, conventional communication systems can send and receive a variety of content, including text messages, image files, audio files, video files, and many other types of content. These communication systems can further leverage capabilities of the internet, cloud storage systems, and other applications on the computing device, and combinations thereof.

As communication systems continue to change, conventional communication interfaces have generally remained the same, with many changes being simply cosmetic. For instance, conventional communication systems for communicating text messages are typically poorly equipped for communicating the variety of modern media content available. These communication systems have similarly failed to adapt to changing consumer tastes. As a result, conventional communication systems often limit the available modes of expression and result in cumbersome or unwieldy message strings.

Furthermore, conventional communication systems often have technological limitations. For example, as file sizes for digital videos and other digital content increases, communication devices often lack requisite processing resources to communicate using modern methods. For instance, messages communicated using conventional communication systems are often limited to content sent or received based on the download and upload speeds of available wireless networks, wireless connectivity conditions, and/or wireless network provider data limits. In addition, where some conventional communication systems involve uploading and accessing digital content from a remote server (e.g., the "cloud"), communication devices often rely on fast and reliable internet connections and/or large amounts of data transfer to upload and/or download message content.

These and other problems exist with regard to messaging and communication.

BRIEF DESCRIPTION OF THE DRAWINGS

The detailed description provides one or more embodiments with additional specificity and detail through the use of the accompanying drawings, as briefly described below.

FIG. 2 illustrates a line graph of an example operation of a communication system in accordance with one or more embodiments.

FIG. 5-1 through FIG. 5-3 illustrate example graphical user interfaces of an audio content application in accordance with one or more embodiments.

FIG. 6-1 through FIG. 6-3 illustrate additional example graphical user interfaces of an audio content application in accordance with one or more embodiments.

FIG. 7-1 through FIG. 7-4 illustrate additional example graphical user interfaces of an audio content application in accordance with one or more embodiments.

DETAILED DESCRIPTION

Figure 1:
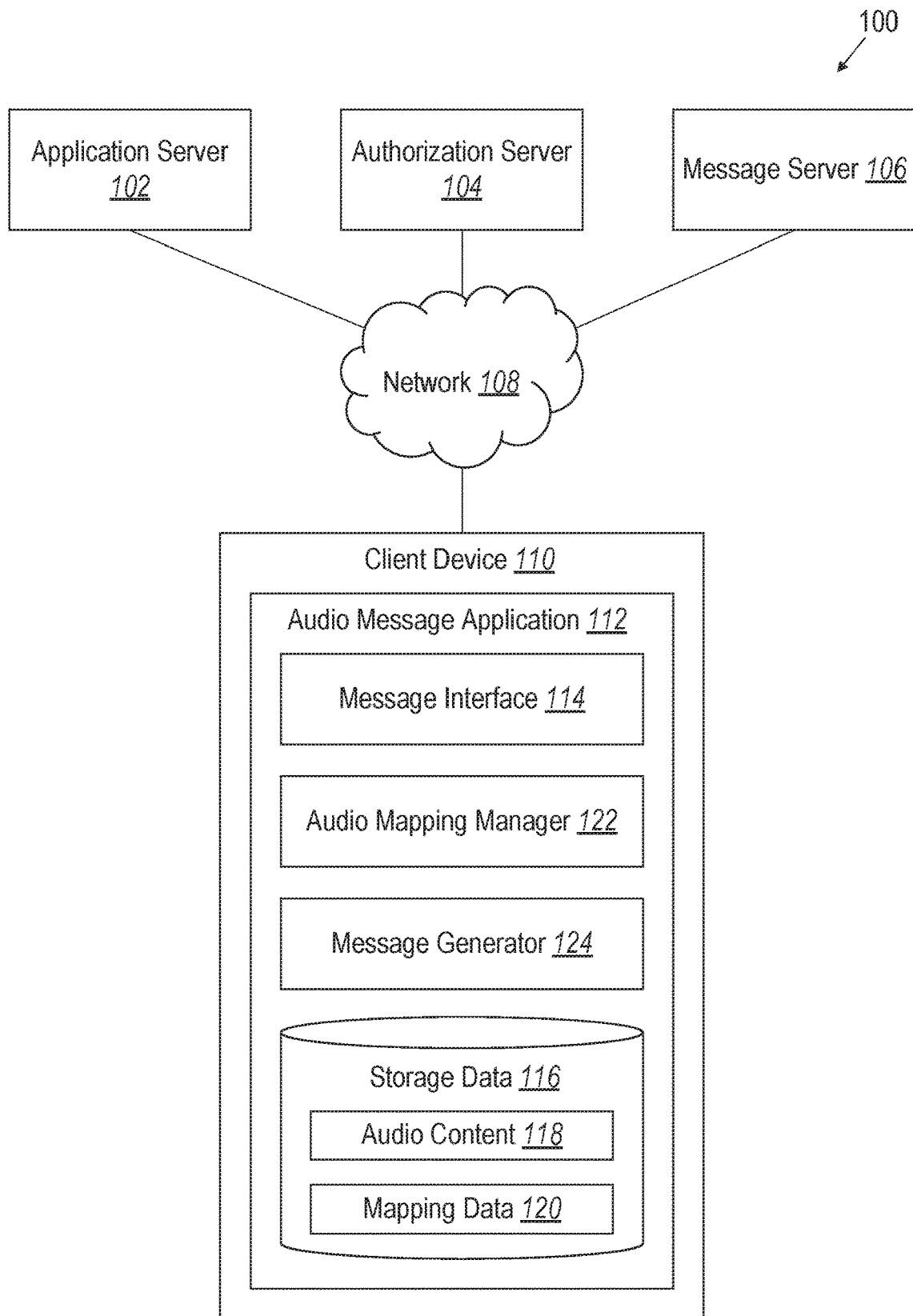
FIG. 1 illustrates a diagram of an environment in which a communication system can operate in accordance with one or more embodiments.

This disclosure relates to devices, systems, and methods for generating and displaying digital messages using audio content items that are stored on a client device. In particular, systems described herein provide a unique and modern communication interface in which a sending device can generate and provide messages including text that is associated with audio and/or visual content. The message including both text and the presentable content can be presented on a receiving device using audio content previously downloaded on the receiving device. Indeed, as will be discussed in further detail herein, systems described herein facilitate communication of messages in which a sender has control of how audio content should be presented. In addition, the systems described herein enable client devices (e.g., sending and receiving devices) to communicate large quantities of data without many of the limitations associated with modern wireless communication.

As an illustrative example, an application installed on a client device may include a plurality of audio files. A descriptive text file may accompany the plurality of audio files and includes identifying words (including their roots and derivatives) associated with the audio file. A graphical image (e.g., a still image) or gif (e.g., an animation) may accompany each audio file and descriptive text file. Based on mapping data in the application, the application determines that a portion of input text matches part of the descriptive text associated with the audio file. The application then generates a message that includes an identifier (e.g., a pointer) for the audio file and any remaining text. A message server receives the message and transmits the message to a second client device that has the application downloaded and installed. The application on the second client device finds the audio file and image or gif stored on the second client device and presents the message. The application may present the message sequentially, such as by presenting any preceding text before presenting the audio file, presenting the audio file and gif, and then presenting any remaining text after the audio file and gif play or finish playing.

In some embodiments, a method for communication includes receiving on a first client device, from an application server, an application package. The application package includes audio content items and mapping data associated with one or more text strings. The application receives text input and determines that a portion of the text input matches one of the audio content items based on the mapping data. The application generates a message that includes the text input and an identifier of the audio content item and transmits the message to a second client device. The second client device receives the application from the application server.

The application on the second client device receives the message, including the text and the identifier of the audio content item. Using the identifier, the application on the second client device identifies the corresponding audio content item and presents the text and the audio content item.

The present disclosure includes a number of practical applications that provide benefits and/or solve problems associated with communication applications. For example, as will be discussed in further detail herein, systems described herein facilitate communication between individuals using multiple media content items and media content types. For example, a message may include a combination of one or more of text content, image content items, and audio content items. The text, image, and audio content may each be included as part of the message, and allow expression in multiple formats to more fully communicate ideas, feelings, emotions, and messages.

In another example, as will be described herein, the systems of the present disclosure may present message content in sequential order. In this manner, the application may present audio content before subsequent text and/or audio content. This may allow the receiver to experience the full desired effect of the audio content before receiving the next portion of a message. Thus, a message may convey additional meaning, including conventionally hard-to-convey emotions such as sarcasm. Furthermore, the sender may utilize multiple audio content items, image content items, and/or text, which the receiving device may present sequentially. For example, a single message may include a first string of text, a first audio content item, a second string of text, and a second audio content item, displayed one after the other in that order. A message in this format may allow the sender to convey multiple ideas, feelings, and emotions in a single message.

Furthermore, as will be discussed further herein, one or more embodiments herein include client devices having an application package including audio content items and mapping data stored on and readily accessible to the client device(s). When a portion of input text (e.g., text input from a user) matches an associated word of an audio content item, the system may determine that the portion of input text matches the audio content item. This allows the system to generate a message that includes an audio content identifier. Nevertheless, because the sending device and the receiving device both have ready access to the audio content item(s), the audio content item(s) need not be transmitted as part of the message(s) between client devices. By locally storing content items on respective client devices, the size of messages transmitted between devices may be significantly decreased. As a result, features and functionality of one or more embodiments described herein may increase message transmission speeds and reduce the data required to send and receive messages between client devices.

As illustrated in the foregoing discussion, the present disclosure utilizes a variety of terms to describe features and advantages of a device management system within a variety of computing environments. Additional detail will now be provided regarding the meaning of such terms. For example, as used herein, a "client device" may refer to any electronic or computing device configured to send and receive messages. In one or more embodiments described herein, a client device refers specifically to mobile phones, tablets, laptop computers, desktop computers, smart watches, gaming consoles, and any other device including hardware and/or software thereon that enables the client device to receive an application package, input messages, transmit content over the internet, receive messages over the internet, and combinations thereof. Indeed, a single client device may be both a sending device, which prepares and transmits messages, and a receiving device, which receives and displays devices.

As used herein, an "application server" may refer to one or more server devices that can transmit application packages to a client device. In one or more embodiments described herein, an application server refers specifically to an application store, such as the Apple App Store, the Google Play store, the Windows App Store, or any other application store or server that hosts and downloads applications to client devices. To illustrate, a client device may send a request to the application server to download an application package, and the application server may transmit the application package to the client device.

As used herein, an "authentication server" may refer to one or more server devices that receives, verifies, and stores user identification information. For instance, a user may register with the authentication server and receive a unique identification code. Each time the user "logs in" to the application, the authentication server may verify an identity of the user and identify each message prepared by the user with the unique identification code. Furthermore, the authentication server may identify unique conversations (e.g., between two users or a group of users) and provide a conversation identification. The authentication server may include the conversation identification in each message in the conversation.

As used herein, a "message server" may refer to one or more server devices that can facilitate message communication between client devices. To illustrate, a message server can receive messages from a sending client device, create a session based on the conversation identification, and store the conversation's messages. The message server can further transmit messages to the receiving client device, such as based on a request from the receiving client device.

As used herein, an "application package" may refer to one or more software packages that includes data and instructions that cause the client device to perform actions, such as transmitting and receiving messages. For example, an application package may include installation instructions, audio content items, image content items, mapping data, descriptive text files, and other content. In one or more embodiments described herein, the application package may include separate content bundles. For example, the application package may include a standard content bundle, which includes a standard set of audio content items, image content items, and associated mapping data. An updated application package may include an additional content bundle, which includes an additional set of audio content items, image content items, and associated mapping data.

As used herein, "mapping data" may refer to information directing the application to a specific file or set of files in the application package based on corresponding text. For instance, mapping data may refer to any association between a portion of text (e.g., a letter, word, series of words) and a corresponding content item or combination of multiple content items (e.g., image and/or audio content item). In one or more implementations, an audio content item is located in an audio content directory of the application package. In one or more embodiments described herein, mapping data may refer to the location within the audio content directory of the audio content item and any descriptive text associated with the audio content item. The mapping data may be the same on different client devices, even different types of client devices (e.g., smartphone, laptop computer).

As used herein, an "audio content item" may refer to a file or other content that includes audio information that can be played on a client device. For instance, an audio content item may include music, sound effects, words, recorded sounds, synthesized sounds, or any other sound that can be displayed via a speaker of a device (or speaker coupled to the device). Audio content items may be stored in any file format, such as .MP3, .WMA, .AAC, .WAV, .FLAC, any other file format, and combinations thereof. Audio content items may be stored on the client device. For instance, audio content items may be received in the application package and stored on the client device as a part of the application package or installed in a directory identified by the mapping data.

As used herein, an "image content item" may refer to a file or other content that include graphical images that can be displayed on a client device. For instance, an image content item may include pictures, cartoons, graphics, still images, moving images, gifs, movies, or any other image content. According to embodiments described herein, image content items may include animated images, which are a series of images displayed in order. Image content items may be stored in any file format, such as .JPG, .TIF, .PNG, .GIF, .MP4, any other file format, and combinations thereof. Image content items may be stored on the client device or on a data storage readily accessible to the client device. For instance, image content items may be received in the application package, and stored on the client device as a part of the application package, or in a directory identified by the mapping data. According to embodiments described herein, an audio content item and an image content item may be combined (e.g., an audio-visual file) or otherwise associated with one another (e.g., two content items associated with the same text string(s)) and/or configured to be presented in conjunction with one another). For instance, a movie content item may include synchronized image content and audio content.

Referring now to the figures, FIG. 1 is a representation of a communication system 100, according to at least one embodiment of the present disclosure. The communication system 100 shown includes an application server 102, an authorization server 104, and a message server 106 (collectively servers) in communication with a network 108, such as the Internet. The servers may be in communication with a client device 110 over the network 108. In other words, the servers may communicate with the client device 110, and the client device 110 may communicate with the servers over the network 108.

The client device 110 includes an audio message application 112, which is received from the application server 102, which will be described in more detail herein. The audio message application 112 includes a message interface 114 (e.g., a graphical user interface, GUI, or other interface). Using the message interface 114, a user may input text via a touchscreen or auxiliary input device. The message interface 114 may enable a user to select text to modify and/or replace with audio content and/or image content, send messages, select messages, display messages, input contacts, send contact requests, and input/receive any other information or data in the audio message application 112. The user may input text using a touch-screen display, a keyboard, voice recognition software, or any other text input method.

The audio message application 112 includes storage data 116 stored in a directory. The storage data 116 includes audio content 118 and mapping data 120. The audio content 118 may include audio content items, such as audio files. The mapping data 120 may include a descriptive text file that provides associating text strings (e.g., letters, words, parts of words, phrases, sentences) for audio content items in the audio content 118. In some embodiments, the associating text strings may include roots and derivatives of the words. The storage data 116 may further include image content, including image content items such as pictures, gifs, and other image content items. The mapping data 120 may include descriptive text for the image content. In some embodiments, the mapping data 120 may associate an audio content item (and/or text) with an image content item. For example, mapping data 120 may identify that an image content item and an audio content item are associated with the same word. In some embodiments, the audio content 118 may include image content items permanently or otherwise statically associated with audio content items. In some embodiments, multiple image content items may be associated with a single audio content item, and a user may select the desired image content item to use with an audio content item. In some embodiments, the same image content item may be associated with multiple audio content items. In some embodiments, the same associating text string may be matched to multiple audio and/or image content items, and a user may select the desired audio and/or image content item(s) for the message from the multiple audio and/or image content items.

The audio message application includes an audio mapping manager 122. The audio mapping manager 122 may analyze input text received from the message interface. The audio mapping manager 122 may compare the input text with the mapping data as the test input is received by the client device 110. The audio mapping manager 122 may determine that a portion of the input text (e.g., a letter, a word, or a set of words) matches a text string from the descriptive text file in the mapping data 120. In some embodiments, the audio mapping manager 122 may exactly (e.g., letter for letter) match the word from the descriptive text file. In some embodiments, the audio mapping manager 122 may match roots (e.g., prefix, base, suffix) and/or derivatives (e.g., verb tenses, nouns, adjectives) of a word from the descriptive text file. This may cause the audio mapping manager 122 to associate the portion of the input text with the audio content item (from the audio content 118) connected to the mapping data 120. The audio mapping manager 122 may then prepare an identifier which identifies and provides an indication or other identifier (e.g., a pointer, a pathway, a directory path) of the specific audio content item from the audio content 118.

A message generator 124 may then generate a message that includes the text input and the identifier. The message generator 124 may only include the identifier in the message, without the audio content item to which the identifier points. Thus, the message may only include text data, including the text input and the identifier (which is a string of text (e.g., code) providing instructions to the identify the audio content item). The audio message application 112 may then transmit the message to the message server 106, which may transmit the message to another client device.

In some embodiments, the storage data 116 may be separate from (e.g., independent of) the rest of the audio message application 112 (e.g., the message interface 114, the audio mapping manager 122, the message generator 124). For instance, the storage data 116 may be located in a file storage directory. The audio message application 112 may access and update (e.g., add content, remove content, change mapping data) the storage data 116 without changing any of the instructions (e.g., the code) of the other aspects of the audio message application 112. In this manner, the storage data 116 may be maintained and/or updated independently of, or without changing or accessing, the functionality of the audio message application 112.

When a message including text data and an identifier is received from the message server 106, the audio mapping manager 122 may use the identifier to access an audio content item from the audio content 118. Similar to the message discussed above, the identifier may include a directory path, file name, file handle, or other identifying information that the audio mapping manager may use to locate the audio content item. In some embodiments, the audio mapping manager 122 may access the mapping data 120 using the identifier to locate the audio content item.

In some embodiments, the storage data 116 may be located in the same location on multiple client devices 110. Furthermore, the storage data 116 may include the same content on multiple client devices 110. In this manner, the identifier may simply identify (e.g., point to) an audio content item and/or the location of the audio content item, and the audio mapping manager 122 may quickly access the audio content item without needing to search a database of all possible audio content item from the application package. This may reduce processor resources and increase the speed of message receipt and display.

When the audio mapping manager 122 locates the audio content item from the audio content 118, the message interface 114 may present the message. In some embodiments, the message interface 114 may display the text data and play the audio content simultaneously. For example, the messaging interface 114 may display text content, image content, and audio content all at once. In some embodiments, the messaging interface 114 may display text content and image content all at once. If the message includes identifiers for audio content items, the first audio content item identified may play first, the second audio content item may play after the first audio content item has finished, and so forth. In some embodiments, the message interface 114 may present the message sequentially. In other words, the message interface 114 may display a first set of preceding text, and then present the audio content. Because audio content takes a period of time (e.g., 0.1 s, 0.5 s, 1.0 s, 1.5 s, 2.0 s, or more) to present, the messaging interface 114 may not present (e.g., may delay) any remaining text and/or audio content until after the audio content has finished playing. In some embodiments, an image content item is associated with the audio content item, and the image content item may be displayed while the audio content item is being played. In some embodiments, the message interface may synchronize presentation of an animated image content item (e.g., a gif) with presenting the audio content item. For example, certain sounds from the audio content item may be associated with certain images in the gif, and the messaging interface 114 may ensure that the sounds and images are presented simultaneously. In some embodiments, the entirety of the content of the message, including sounds, text, and images may be displayed simultaneously.

In some embodiments, the audio content 118 may include one or more bundles. For example, the initial audio message application 112 may be downloaded to the client device 110 with an initial audio content 118 bundle, which includes an initial set of audio content items. A second audio content 118 bundle, which include a second set of audio content items, may be downloaded from the application server 102 and added to the storage data 116. The audio message application 112 may store the second audio content 118 bundle in the same directory as the first audio content 118 bundle. In some embodiments, the audio message application 112 may store the second audio content 118 bundle in a different directory as the first audio content 118 bundle to prevent errors by the audio mapping manager when locating the audio content item identified in the identifier.

Figures 1, 5:
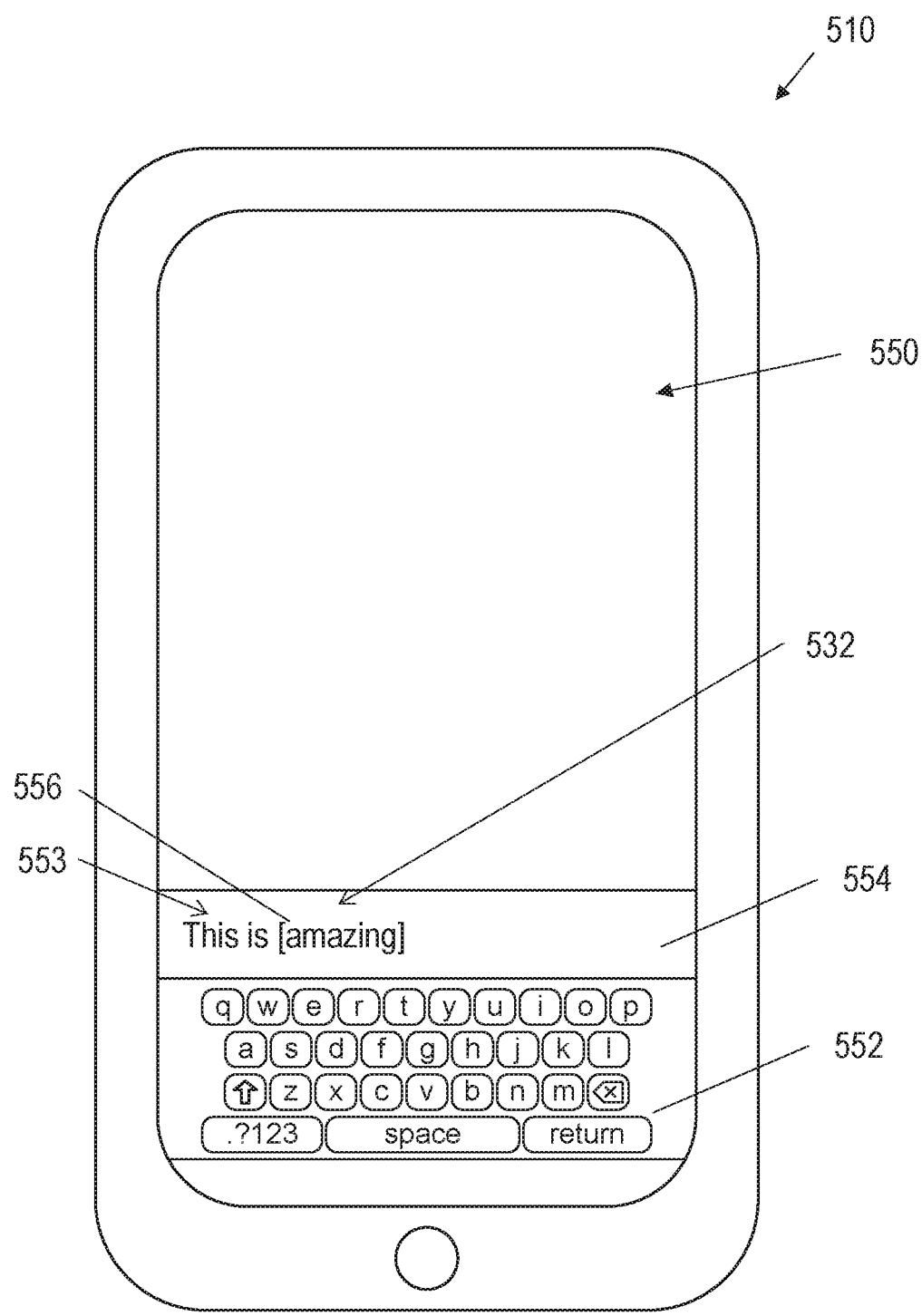
Figures 2, 5:
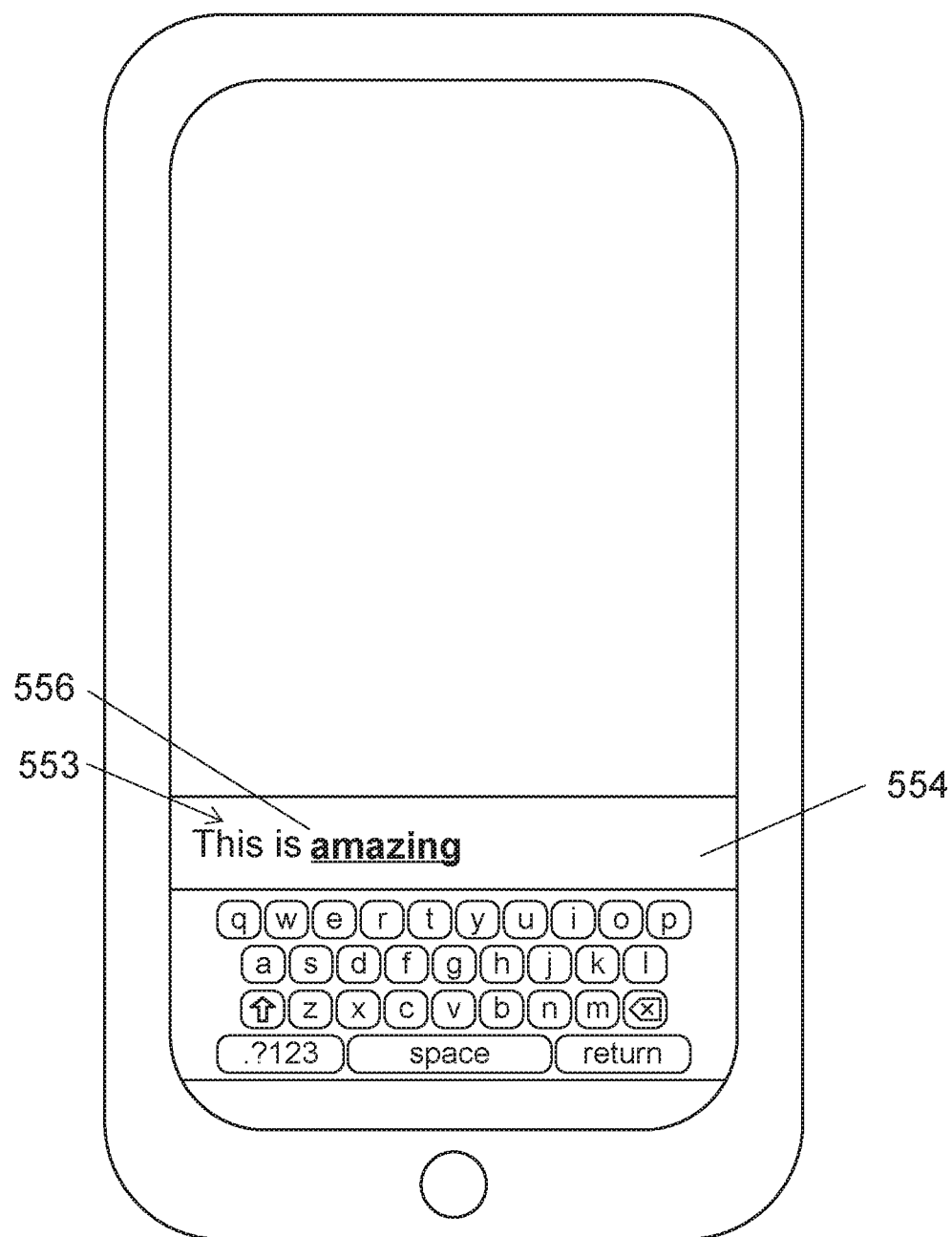
Figures 3, 5:
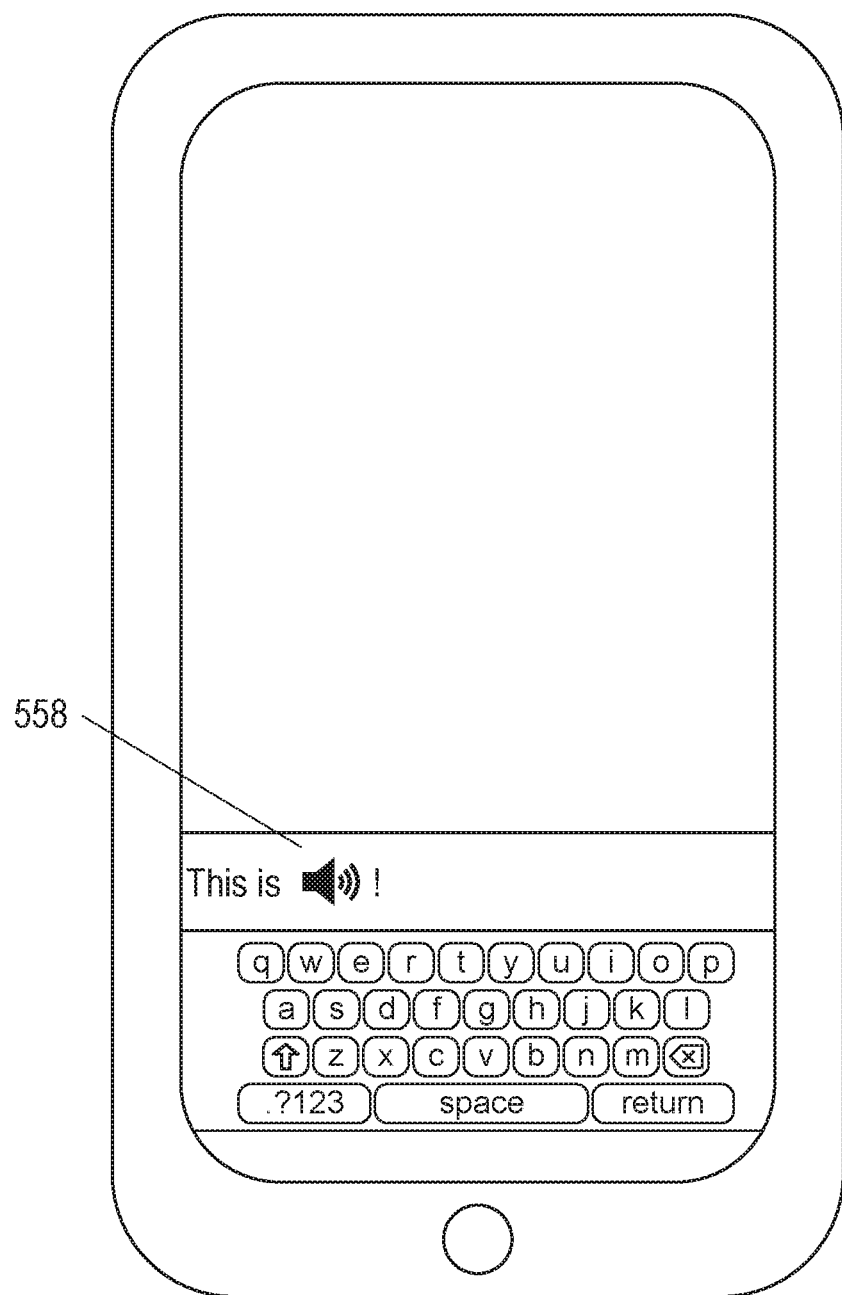

FIG. 2 is a representation of a line graph illustrating interactions between components of the communication system 200 in accordance with at least one embodiment of the present disclosure. As shown in FIG. 2, an application server 202 may provide (e.g., deliver, download, transmit) an application package (collectively 226) to one or more client device(s) (collectively 210). The client device 210 may receive the application package 226 from the application server 202. In the embodiment shown, a first client device 210-1 receives a first application package 226-1 from the application server 202 and a second client device 210-2 receives a second application package 226-2 from the application server 202. In some embodiments, the first application package 226-1 and the second application package 226-2 are the same. For example, the first client device 210-1 and the second client device 210-2 may receive the same application package 226, including the same audio message application (e.g., audio message application 112 of FIG. 1) having the same audio content (e.g., audio content 118 of FIG. 1) and the same mapping data (e.g., mapping data 120 of FIG. 1). Thus, any identifiers in messages transmitted between the client devices 210 may be used to access audio content items from the audio message applications received at the respective client devices 210.

In some embodiments, the application package 226 includes all of the audio message application. In some embodiments, the application package 226 includes a software update. In some embodiments, the application package 226 includes an update to the storage data (e.g., storage data 116 of FIG. 1). For example, the application package 226 may be an audio content bundle that includes additional audio content items to be used during messaging.

In some embodiments, a user may develop an account (e.g., register, sign in) with the authentication server 204. The user may receive a user identification, which is a unique identification tied to user credentials. In some embodiments, the user credentials may be specific to a client device 210. In some embodiments, the user credentials may be agnostic to the client device 210. For example, the user credentials may be an email address, a social networking account, or any independent user credential that may be used to verify an identity of an individual. Thus, a user may sign into multiple client devices 210 with the same user identification. Therefore, conversations may be between registered users, and not between specific devices.

When the user signs in on the client device 210, the authentication server 204 sends an authentication (collectively 228) to the client device 210. Thus, the authentication server 204 may send a first authentication 228-1 to the first client device 210-1 establishing a first identification of the first user. The authentication server 204 may further send a second authentication 228-2 to the second client device 210-2 establishing a second identification of the second user.

After being authenticated, the first client device 210 may generate a first message at 230. The message may include text data and/or an identifier for an audio content item. The client device may transmit the first message 232-2 to a message server 206. The first message 232-2 may include metadata, such as the identifier, the first user's identification, the sender's identification, and so forth. The metadata may help the message server 206 to identify the sender and the recipient, store the first message 232-2 in the appropriate location, and send the message to the intended recipient.

The message server may receive a conversation identification 234 from the authentication server 204. The conversation identification 234 may uniquely identify the message participants. Using the conversation identification 234, the message server 206 may initiate a session at 236. The session may be tied to the conversation identification 234. Thus, each conversation between users (including more than two users) may have a session stored on the message server. The session may store each message between the first user and the second user, regardless of which client device 210 sent or received the message. The message server 206 may further track whether or not a recipient user (e.g., a user who receives a message) has accessed the message.

The message server 206 may send the first message and its associated metadata 232-1 to the second user on the second client device 210-2. In other words, the second client device 210-2 receives the first message and associated metadata 232-1 from the message server 206. In some embodiments, the second client device 210-2 may receive the first message 232-2 when the audio content application is opened. For example, when the audio content application is opened (e.g., by the user), the audio content application may send a request to the message server 206 for any change to the session. If the second client device 210-2 inspects the session on the message server 206 and identifies that the second client device 210-2 has not displayed the first message 232-1, then the second client device 210-2 may download (e.g., receive) the first message 232-2 from the message server 206. In some embodiments, the message server 206 may push the first message 232-2 to the audio content application. For example, after the message server 206 initiates and/or updates the session, the message server 206 may send the first message 232-2 to the second client device 212-2. A message receiving module may be running in the background of the second client device 212-2, and may receive the first message 232-2 when the message server 206 sends it.

The second client device 210-2 may present the first message 232-1 at 238, including locating and playing the audio content from the identifier in the first message 232-2. The second client device 210-2 may then send a response in the form of a second message 232-2. The message server 206 may receive the second message 232-2 and update the session at 240. The first client device 210-1 may receive the second message 232-2 and present the second message at 238. While the embodiment shown only uses a single message transmitted from the first client device 210-1 and the second client device 210-2, it should be understood that multiple messages may be sent and received from one or both of the first client device 210-1 and the second client device 210-2.

Figure 3:
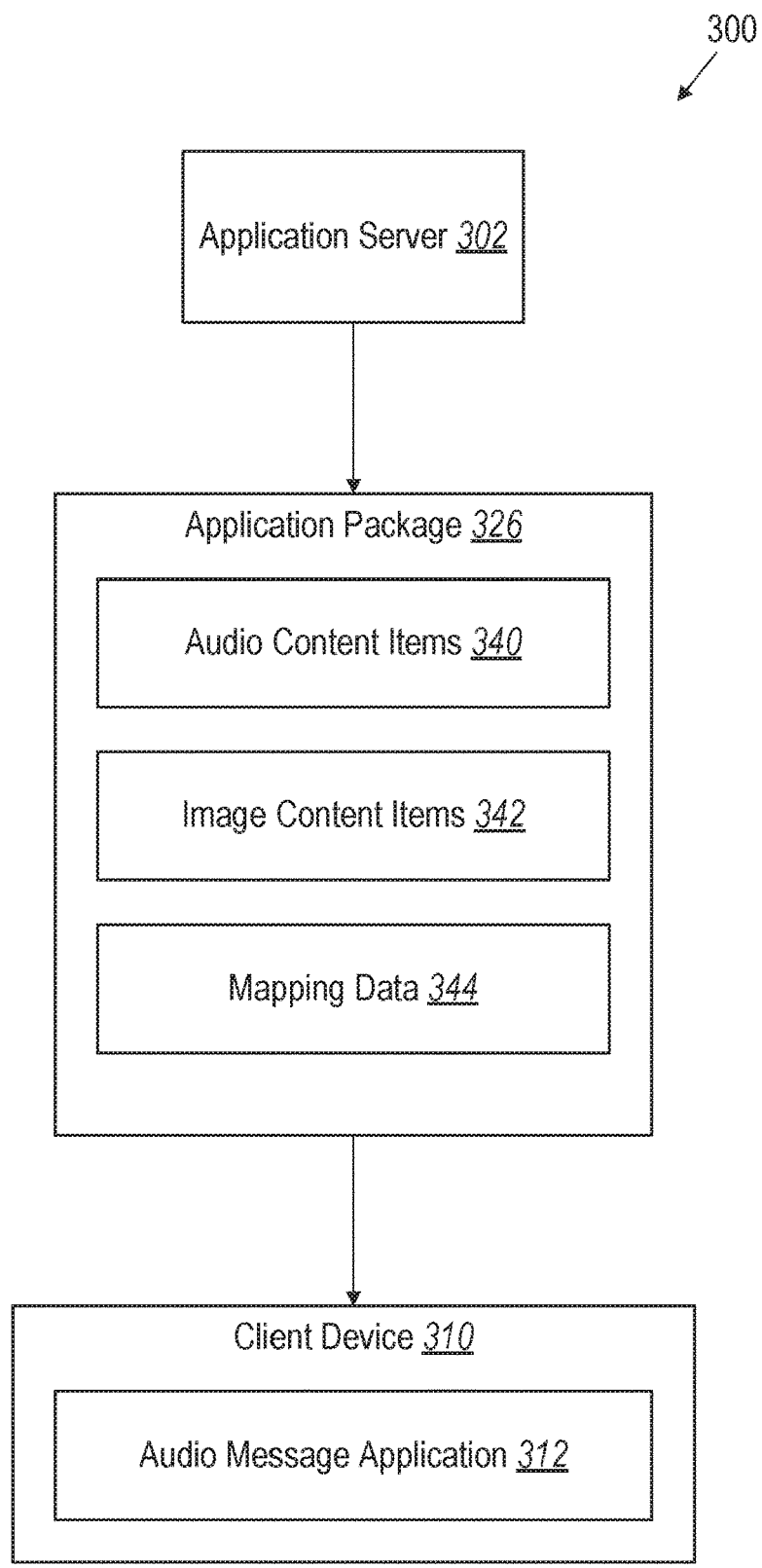
FIG. 3 illustrates a schematic diagram of a communication system between an application server and a client device in accordance with one or more embodiments.

FIG. 3 is a representation of a communication system 300 between an application server 302 and a client device 310, according to at least one embodiment of the present disclosure. The client device 310 receives (e.g., downloads) an application package 326 from the application server 302. The application package 326 includes audio content items 340, image content items 342, and mapping data 344. In some embodiments, the audio content items 340 are combined with the image content items 342. In some embodiments, the mapping data includes one or more descriptive word files associated with the audio content items 340 and/or the image content items 342. In some embodiments, the client device 310 may install the application package 326 as the audio message application 312. In some embodiments, the application package 326 may be an update to the audio message application 312, including new audio content items 340, new image content items 342, and/or new mapping data 344.

Figure 4:
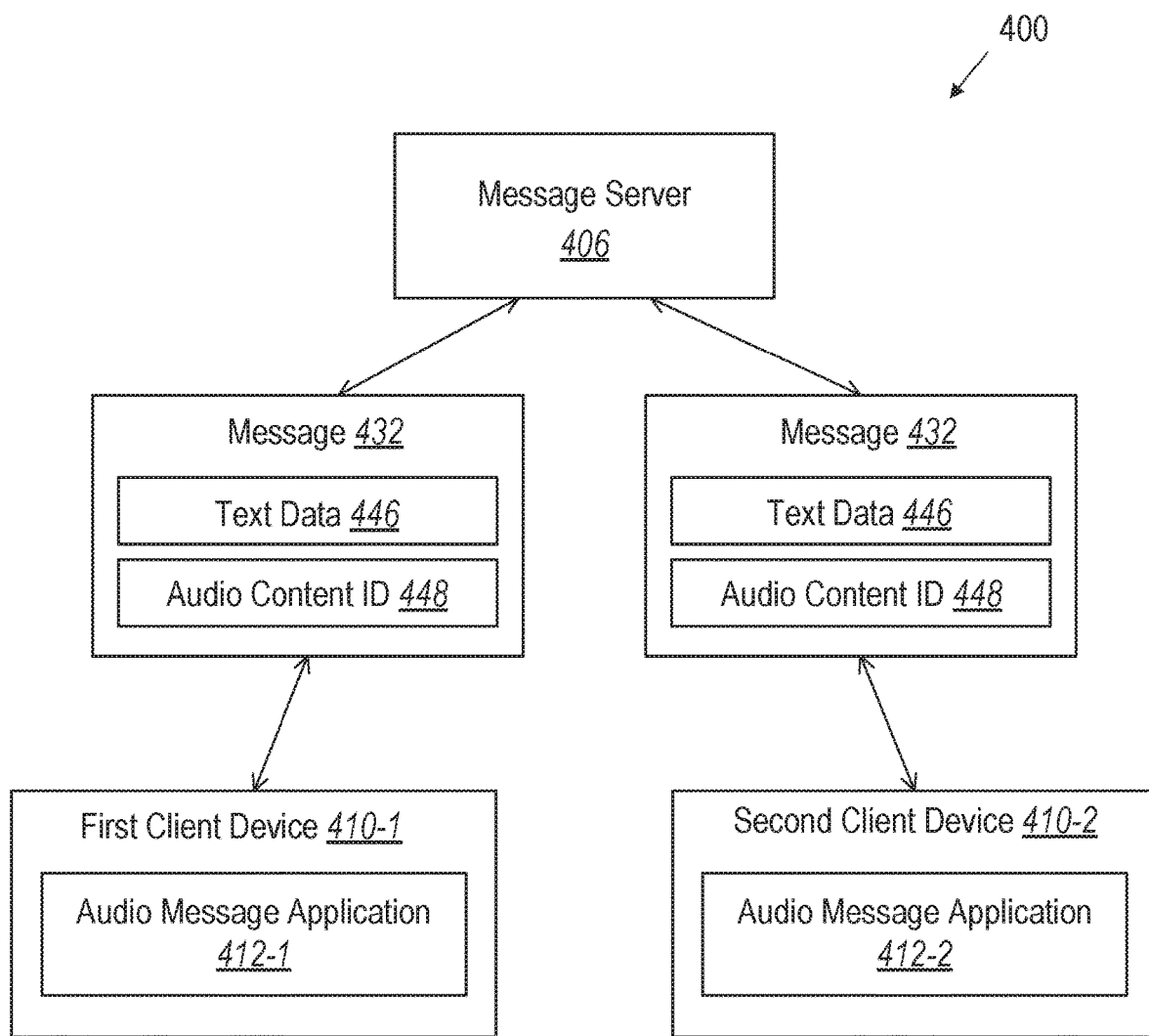
FIG. 4 illustrates a schematic diagram of a communication system between a message server and client devices in accordance with one or more embodiments.

FIG. 4 is a representation of a communication system 400 between a message server 406 and client devices (collectively 410), according to at least one embodiment of the present disclosure. The message server 406 may send messages 432 to and receive messages 432 from the client devices 410. Each message 432 may include text data 446 and/or an audio content identifier 448. The client device 410 may generate and display the messages 432 using the audio message application (collectively 412-1).

In some embodiments, a message 432 may be transmitted between the first client device 410-1 and the second client device 410-2 in the following manner. The first audio message application 412-1 on the first client device 410-1 may generate a message 432. The first audio message application 412-1 may send the message 432 to the message server 406, which may create or update a session with the message 432. The message server 406 may then send the message 432 to the second client device 410-2. The second audio message application 412 may receive and display the message 432 on the second client device 410-2. The second audio message application 412 may then generate a message 432, including text data 446 and/or an audio content identifier 448, and send it to the message server 406. The message server 406 may send the message 432 to the first client device 410-1, and the first audio message application may display the message 432.

While embodiments of the present disclosure communicate message(s) 432 between client devices 410 using a message server 406, it should be understood that the first client device 410-1 and the second client device 410-2 may communicate directly with each other. In other words, the first client device 410-1 may send a message 432 directly to the second client device 410-2, and the second client device 410-2 may send a message 432 directly to the first client device 410-1.

FIG. 5-1 through FIG. 5-3 are representations of a graphical user interface (GUI) 550 of an audio message application on a client device 510, according to at least one embodiment of the present disclosure. While the client device 510 shown resembles a smartphone or tablet, it should be understood that the client device 510 may be any client device, including a smartphone, tablet, laptop computer, smartwatch, or other client device. Similarly, while the client device 510 utilizes a touch-screen display for input, it should be understood that input data may be received by any input device, including a keyboard, a mouse, a trackpad, a microphone in communication with voice recognition software, any other input device, and combinations thereof.

In the embodiment shown, the client device 510 is the "sending device." In other words, a user may generate a message 532 by inputting text using the keyboard 552 into the audio message application and send the message to a recipient. The user may enter the text input 553 on the keyboard 552, which may be displayed as it is input in a message generation window 554. The audio content application may determine that a portion 556 of the text input 553 matches mapping data in the audio content application.

As may be seen in FIG. 5-2, the audio content application may identify the portion 556 of the text input 553 in the message generation window 554 (e.g., based on or otherwise in response to determining that the portion 556 matches mapping data). For example, the audio content application may visually identify the portion 556 of the text input 553, such as by highlight, bold, italicize, change color, animate, otherwise visually identify, and combinations thereof. In some examples, the audio content application may aurally (e.g., audibly) identify the portion 556 of the text input 553, such as with a sound, a ding, a ping, a notification, otherwise aurally identify, and combinations thereof. In some embodiments, the audio content application may physically (e.g., haptically) identify the portion 556 of the text input 553, such as by buzzing, vibrating, jolting, bumping, otherwise physically identifying, and combinations thereof. In some embodiments, the audio content application may identify the portion 556 of the text input 553 using a combination of any two or all of visually, aurally, and physically identifying the portion 556.

In some embodiments, the user may select the identified portion 556 of the text input 553. This may cause the audio content application to associate an audio content item with the portion 556 of the text input 553. In some embodiments, the identified portion 556 may be associated with more than one audio content item. In this example, the audio messaging application may provide one or more selectable options enabling the user to select which audio content item he or she wishes to use in the message. For example, the user may tap on the identified portion 556 multiple times until the desired audio content item is selected. In some embodiments, when the user taps on the identified portion 556, the audio content application may present (e.g., play) the audio content item. This may help the user to know which audio content item will be associated with the message.

As may be seen in FIG. 5-3, the portion 556 may be replaced with the audio content item (represented by the sound symbol 558). In some embodiments, the audio content item may play in lieu of displaying the portion 556 (e.g., the portion 556 is removed from the message and the audio content item is played at the point when the portion 556 would be displayed).

In the example shown in FIG. 5-1 through FIG. 5-3, the message includes the input text "This is amazing!" The word "amazing" may be associated with an audio content item, such as fanfare, trumpets, or other audio content item. Thus, in the message shown in FIG. 5-3, the word "amazing" has been replaced with the fanfare, trumpets, or other audio content item. In this manner, the user may communicate the level of excitement he or she is feeling. As discussed above, conventional communication systems convey emotion with difficulty, and adding audio content items to a message may allow a user to convey a broader range and depth of emotion with the audio content application.

Figures 1, 6:
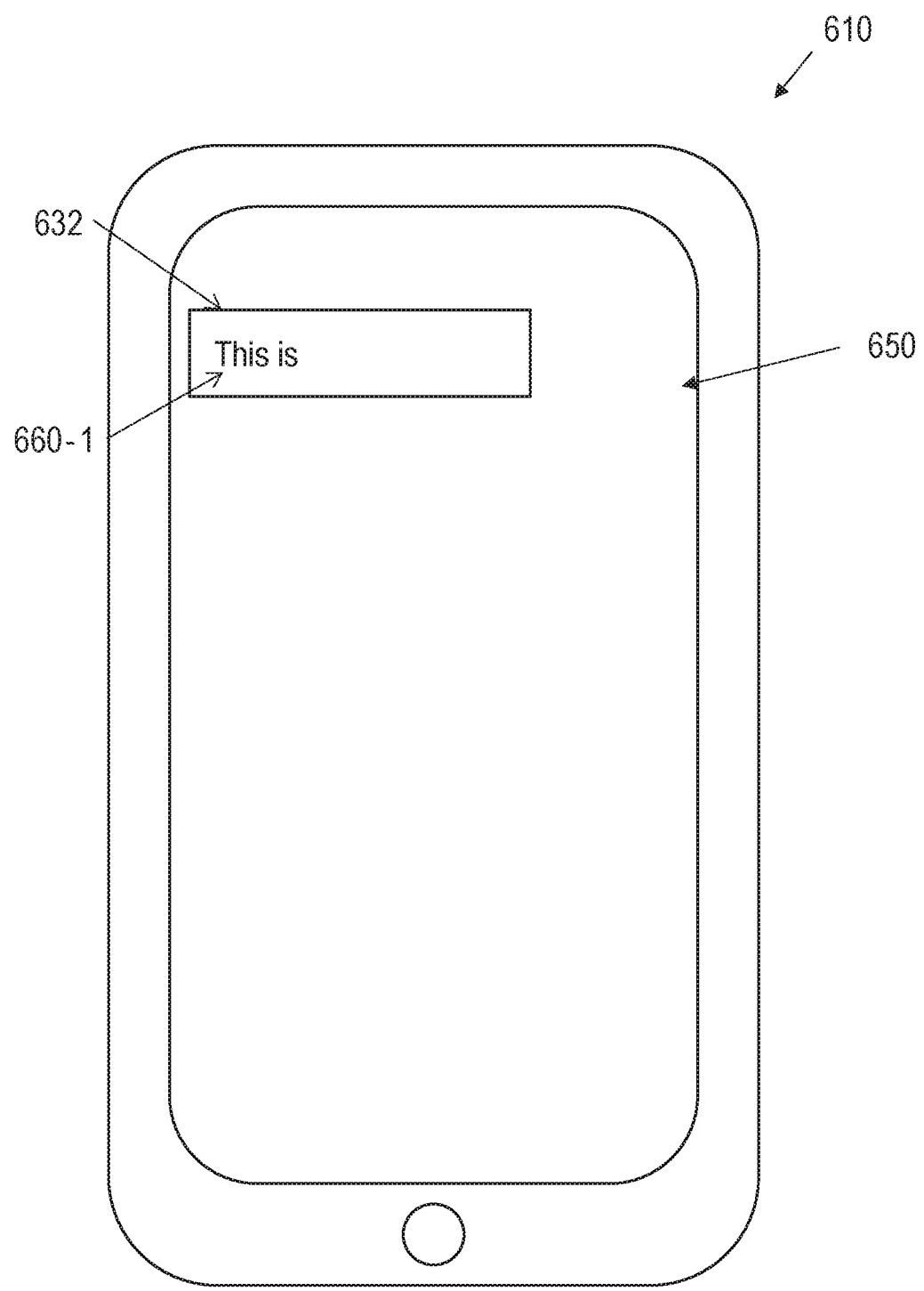
Figures 2, 6:
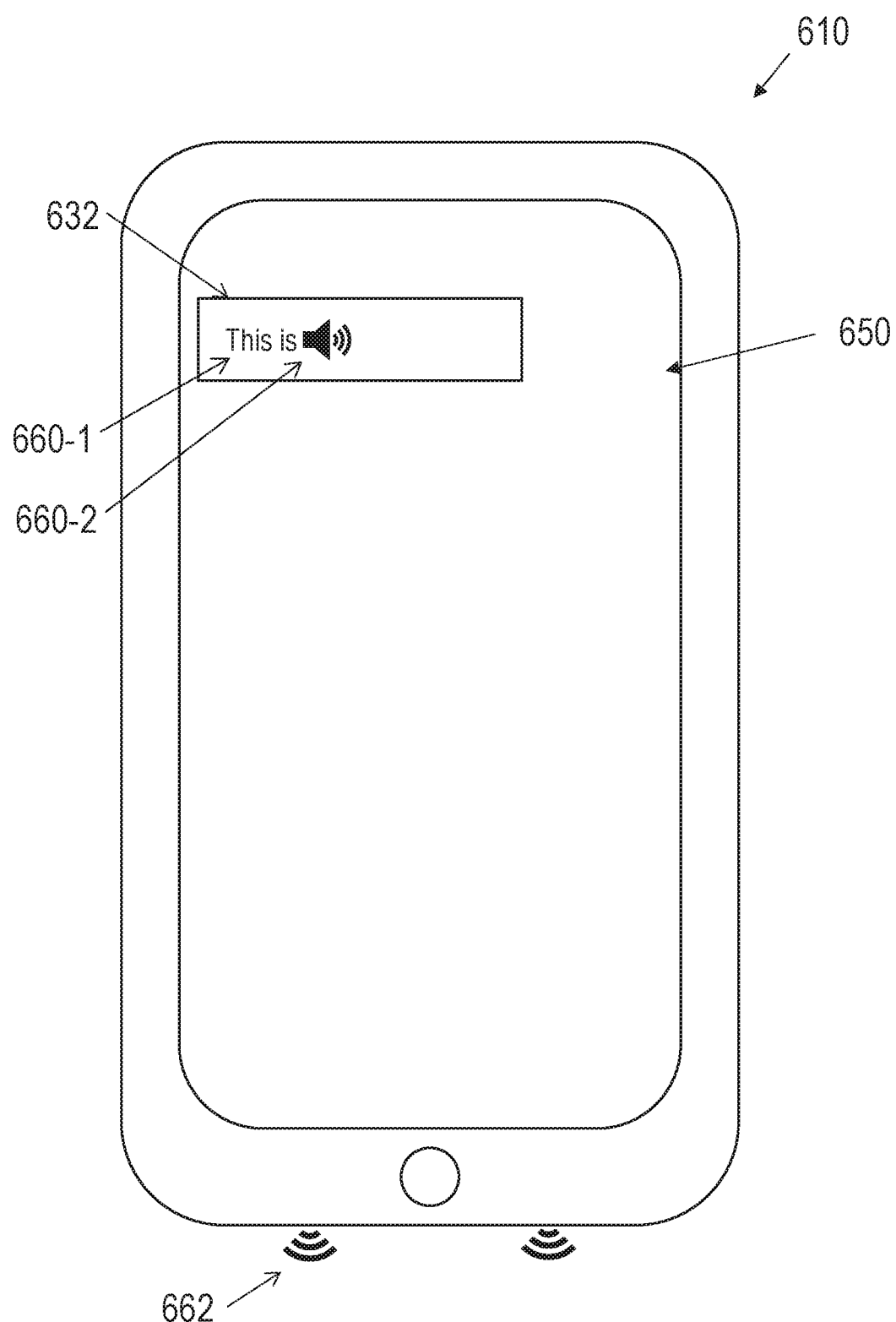
Figures 3, 6:
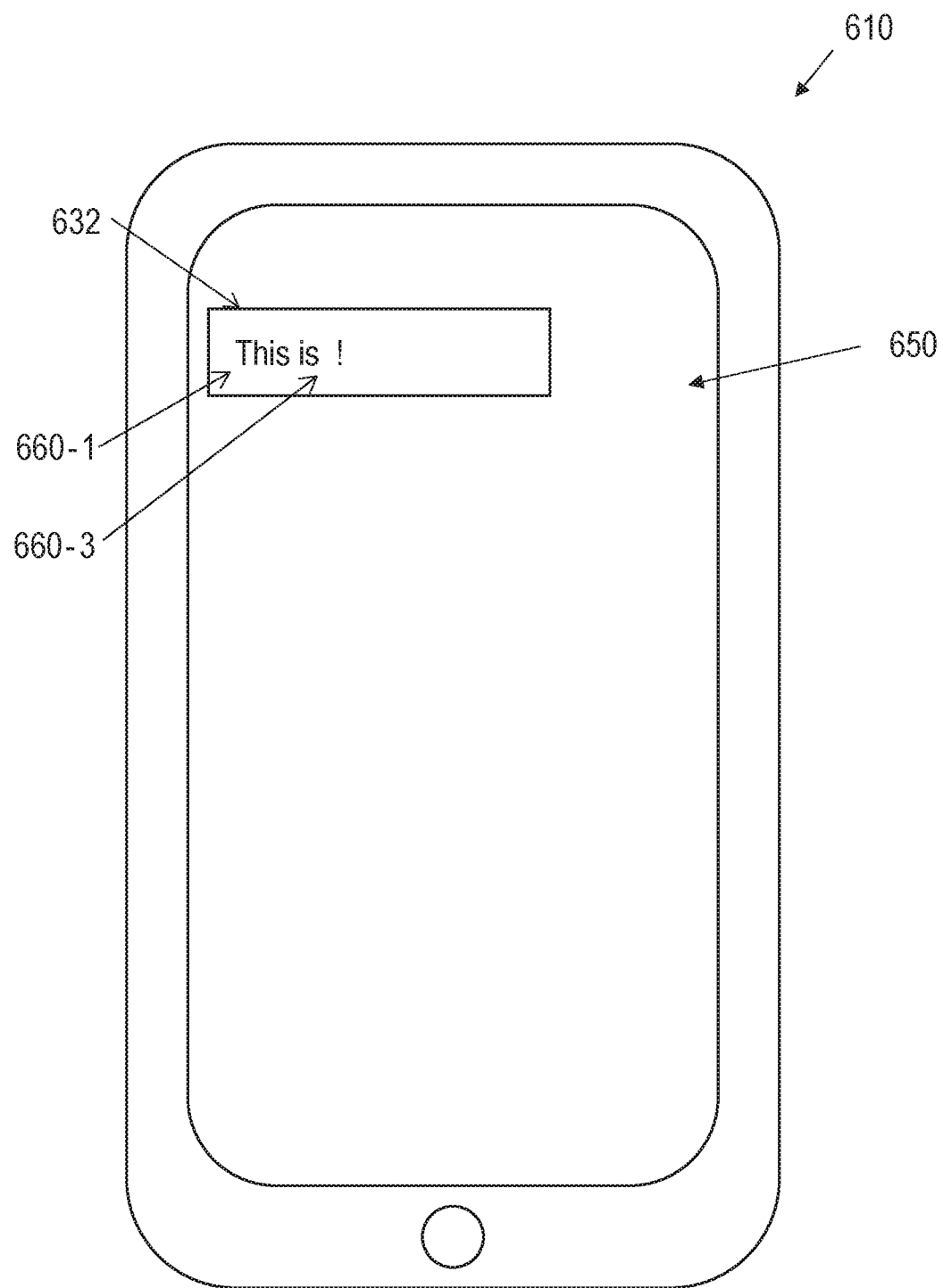

FIG. 6-1 and FIG. 6-3 are representations of a graphical user interface (GUI) 650 of an audio message application on a client device 610, according to at least one embodiment of the present disclosure. In the embodiment shown, the client device 610 is receiving the message 632 generated and sent from the client device 510 in FIG. 5-1 through FIG. 5-3. Thus, in the embodiment shown, the client device 610 is the "receiving device," or the device that is receiving the message 632.

The audio content application may present the message 632 sequentially. Thus, the audio content application may initially present a first portion 660-1 of the message 632. In the embodiment shown, the first portion 660-1 is a text string inclusive of the words "This is." In some embodiments, an entirety of the first portion 660-1 may appear simultaneously. In other words, the words "This" and "is" may appear on the display at the same time. In some embodiments, the word "This" may appear first, followed by "is" after a word delay. For example, the word delay may include 0.05 s, 0.1 s, 0.2 s, 0.3 s, 0.4 s, 0.5 s, 0.6 s, 0.7 s, 0.8 s, 0.8 s, 0.9 s, 1.0 s, or any value therebetween. In some embodiments, each letter of the first portion 660-1 may appear sequentially, separated by a letter delay. For example, the letter delay may include 0.05 s, 0.1 s, 0.2 s, 0.3 s, 0.4 s, 0.5 s, 0.6 s, 0.7 s, 0.8 s, 0.8 s, 0.9 s, 1.0 s, or any value therebetween.

In some embodiments, the sender (e.g., the sending client device) may select the word delay and/or the letter delay of the message 632 to be displayed at the receiving client device 610. This may further allow the sender to customize the emotional or other content of the message 632. In some embodiments, the receiver (e.g., the receiving client device) may select the word delay and/or the letter delay of the message 632 to be displayed. This may allow the user to customize the user experience to his or her preferences, thereby improving the user experience and reducing boredom or frustration from slowly presenting messages.

After the audio content application displays the first portion 660-1, the audio content application may present a second portion 660-2, as shown in FIG. 6-2. The second portion 660-2 may include an audio content located by the audio content application based on an identifier received in the message 632. The audio content application may present (e.g., play) the second portion 660-2 over any connected speakers. For example, the audio content application may play the second portion over speakers 662 on the client device 610, over headphones plugged into the client device 610, over a speaker connected to the client device via wireless signal (e.g., Bluetooth, Wi-Fi), any other speaker, and combinations thereof. As discussed above, the audio content application may include one or more bundles of audio content items. In some embodiments, if the receiving client device 610 has not downloaded a bundle including the audio content item from the second portion 660-2, then the audio content application may provide an alert. For example, the audio content application may provide a low-fidelity version of the audio content item, the audio content application may provide a visual notification (e.g., a pop-up bubble or other notification) that the audio content item is not installed on the client device 610, or the audio content application may present a sound notification (e.g., a noise) indicating that the audio content item is not installed on the client device 610.

After the second portion 660-2 has played, the audio content application may continue to sequentially present portions of the message 632. In some embodiments, the audio content application may present additional portions of the message 632 after the audio content item has finished playing. In some embodiments, the audio content application may begin presenting additional portions of the message 632 before the audio content item has finished playing. For example, the audio content application may begin presenting additional portions of the message 632 with an audio content percent delay, which is the time after the audio content item starts playing when additional content begins presenting divided by the total audio content duration. In some embodiments, the audio content percent delay may be 5%, 10%, 20%, 30%, 40%, 50%, 60%, 70%, 80%, 90%, 95%, or any value therebetween. In some embodiments, the audio content application may begin presenting additional portions of the message 632 after an audio content time delay has passed, where the audio content time delay is the amount of time after the audio content item started playing. In some embodiments, the audio content delay may be 0.1 s, 0.25 s, 0.5 s, 0.75 s, 1.0 s, 2.0 s, 3.0 s, 4.0 s, 5.0 s, or any therebetween.

In some embodiments, the sender (e.g., the sending client device) may select the audio content percent delay and/or the audio content time delay of the message 632 to be displayed at the receiving client device 610. This may further allow the sender to customize the emotional or other content of the message 632. In some embodiments, the receiver (e.g., the receiving client device) may select the audio content percent delay and/or the audio content time delay of the message 632 to be displayed. This may allow the user to customize the user experience to his or her preferences, thereby improving the user experience and reducing boredom or frustration from slowly presenting messages.

As shown in FIG. 6-3, after the audio content item has been presented, the audio content application may present a third portion 660-3 of the message 632. In the embodiment shown, the third portion 660-3 is an exclamation point. However, it should be understood that the third portion 660-3 may be an audio content item, an image content item, a longer string of text, or any other item. Furthermore, it should be understood that any portion 660-1, 660-2, 660-3 may be any type of content, including audio content items, image content items, and text content. The message 632 may include any number of portions 660, including 1, 2, 3, 4, 5, 6, 7, 8, 9, 10, or more portions.

Furthermore, as may be seen, the audio content item has replaced the word "amazing." In some embodiments, the word "amazing" may be displayed while the audio content item is being played. In some embodiments, as will be discussed herein, the word "amazing" may be replaced with an image content item, such as a trumpet or other image content item.

Figures 1, 7:
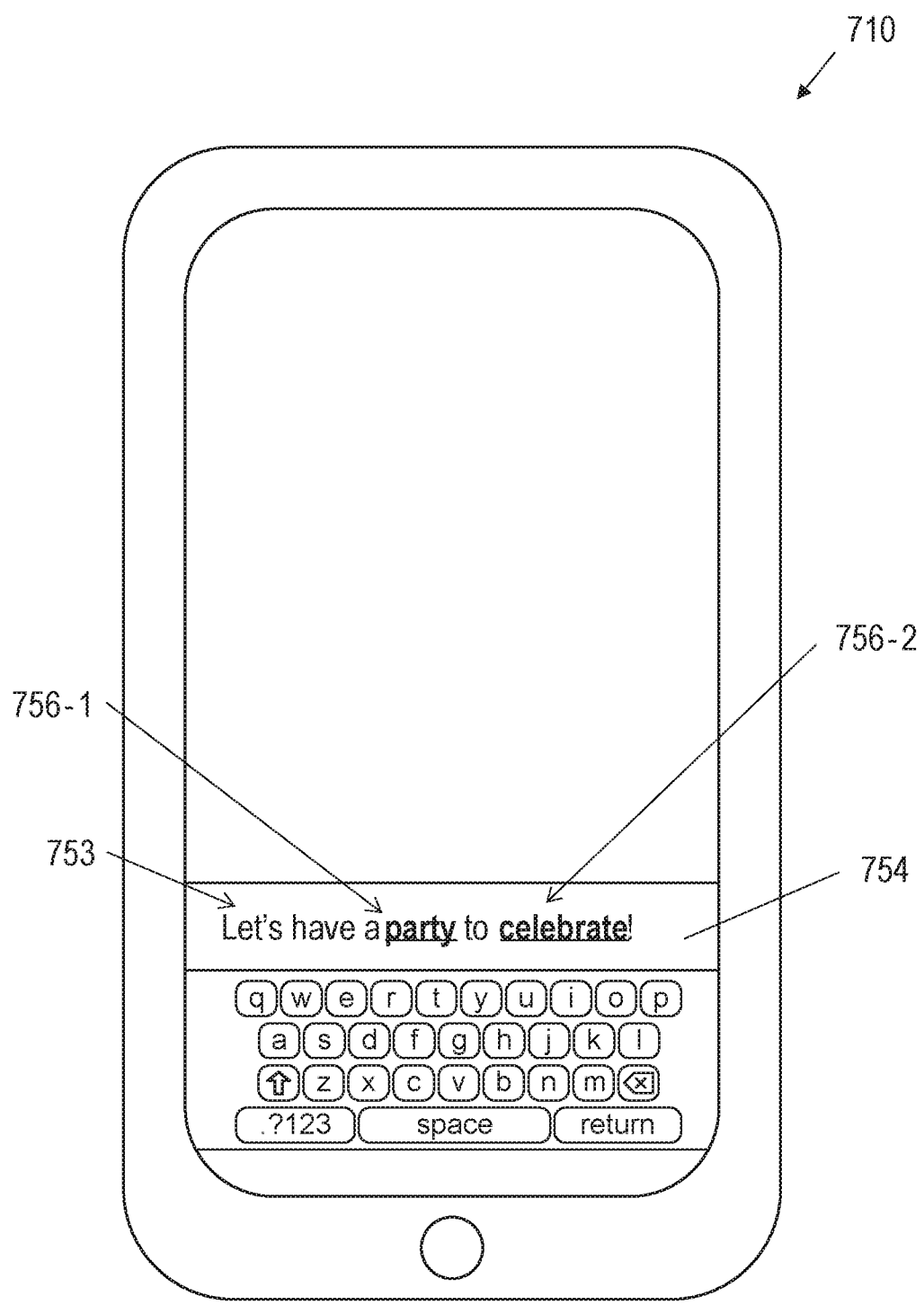
Figures 2, 7:
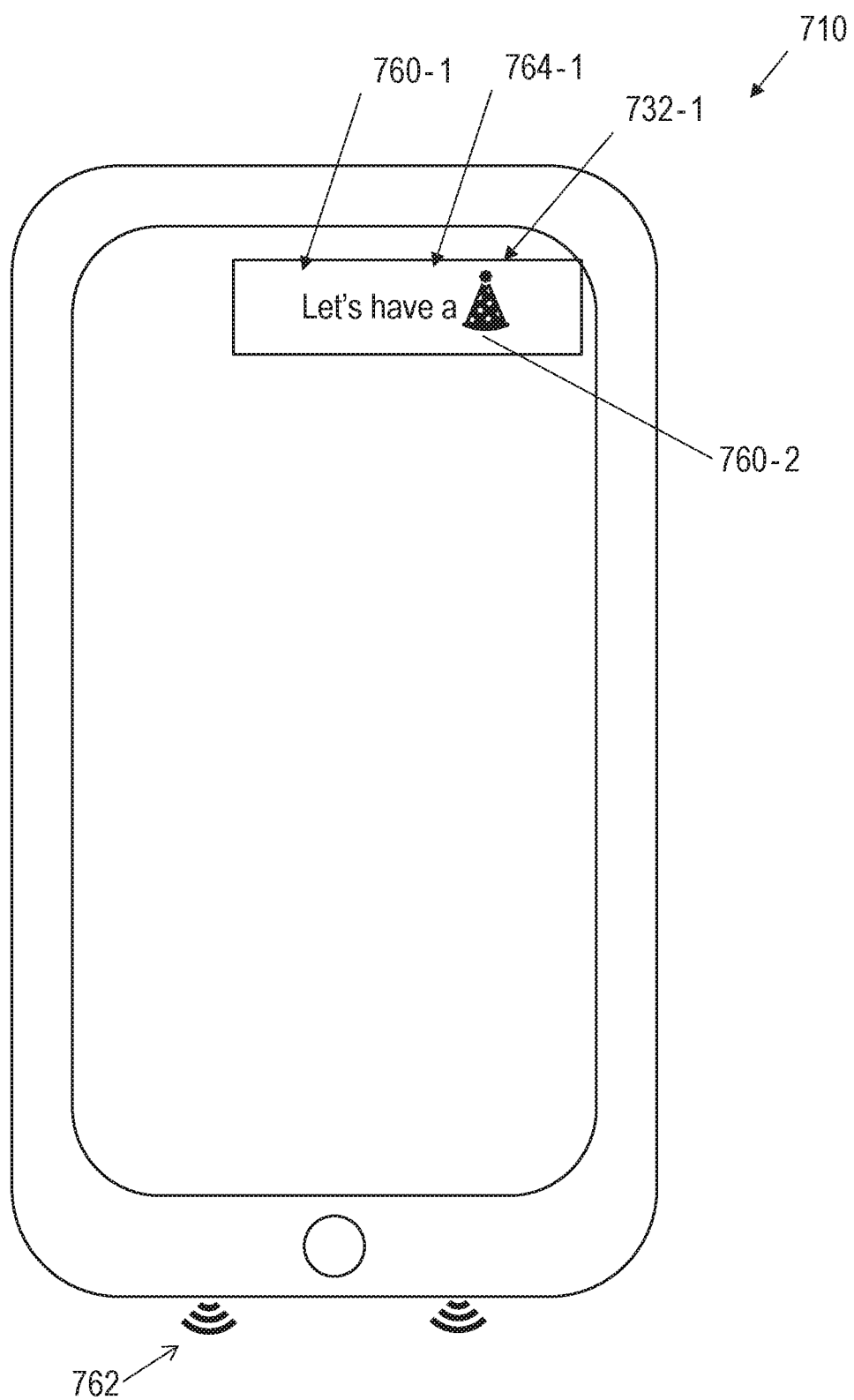
Figures 3, 7:
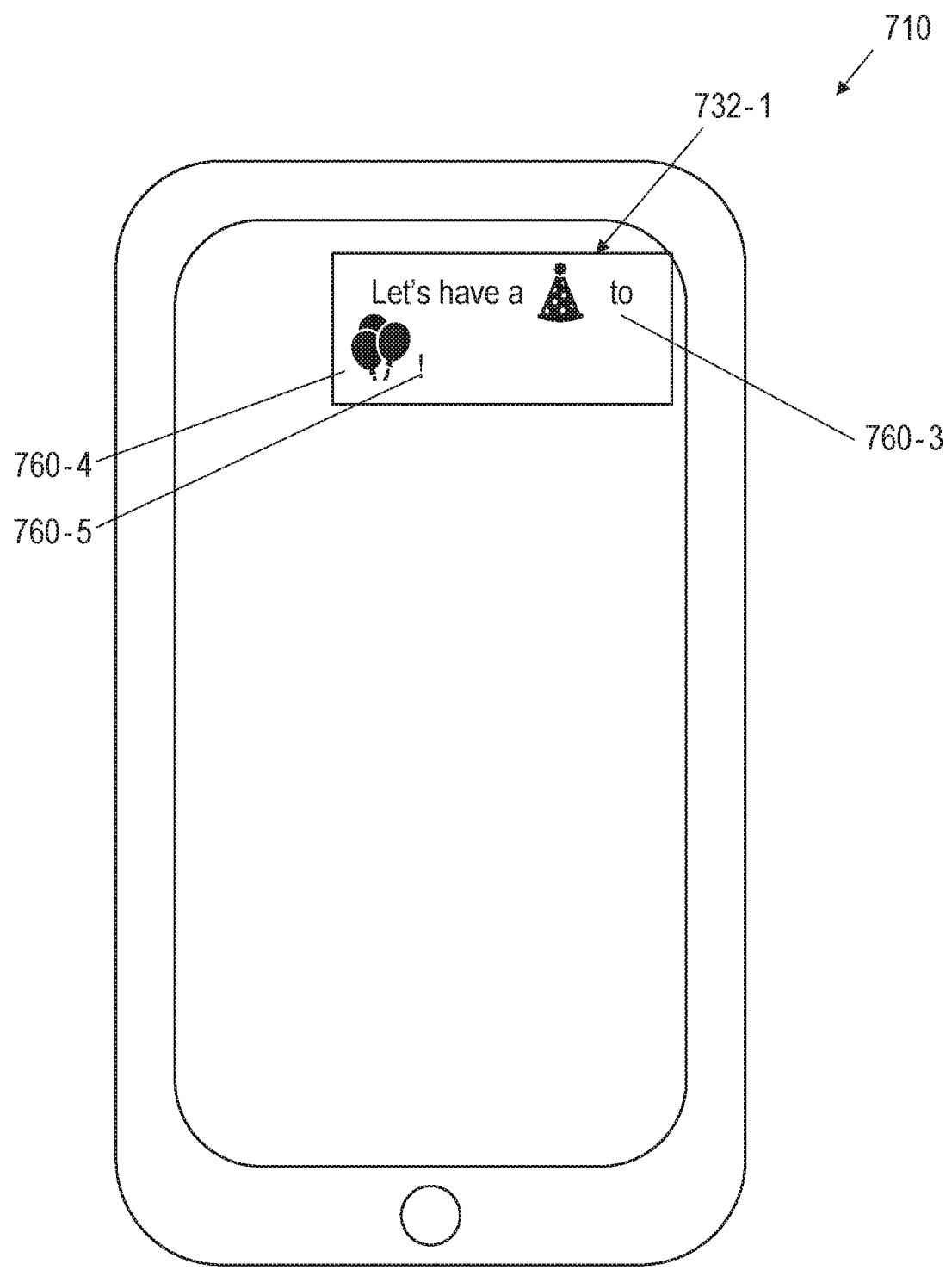
Figures 4, 7:
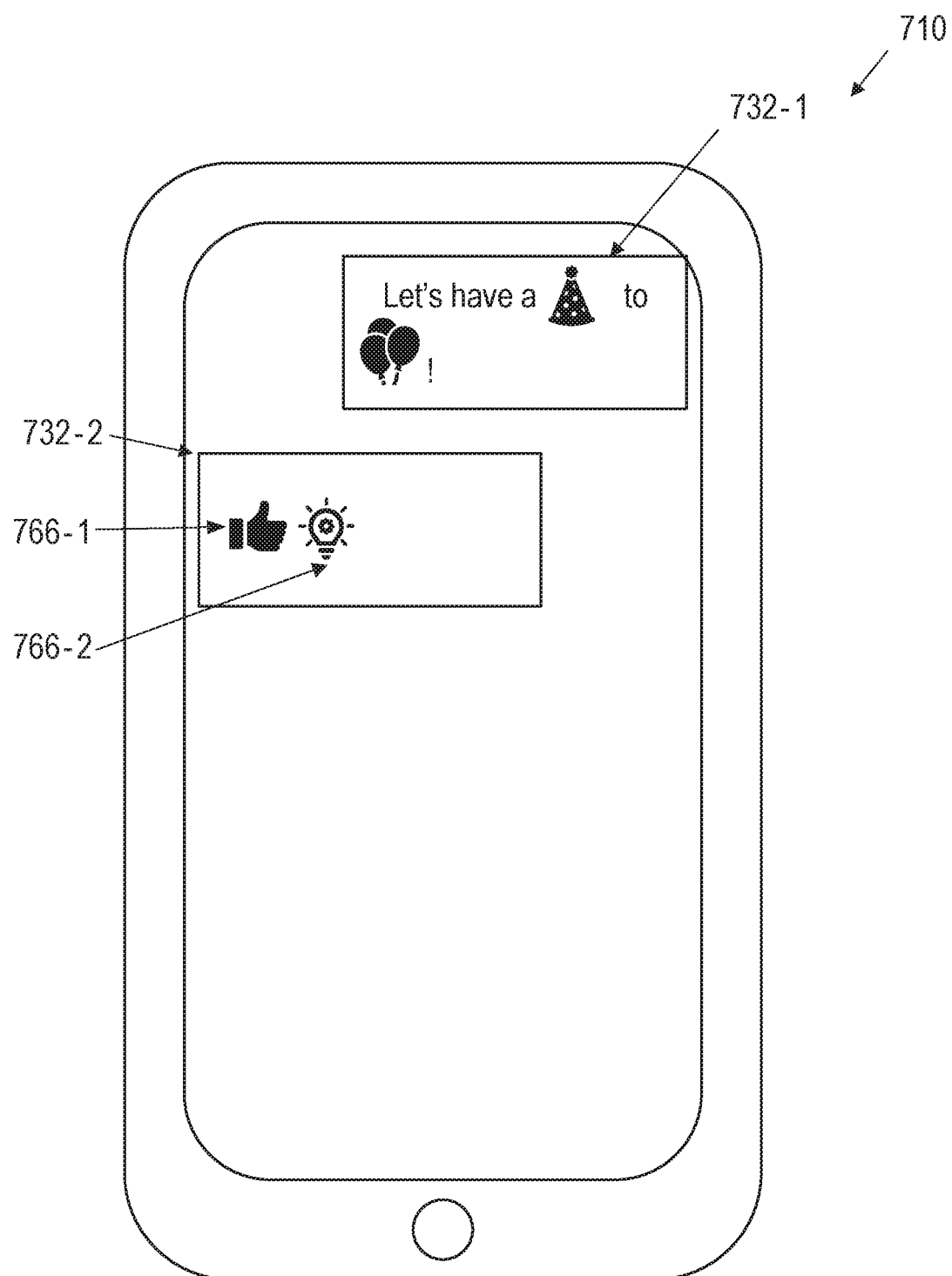

FIG. 7-1 through FIG. 7-4 are representations of a conversation on a client device 710, according to at least one embodiment of the present disclosure. In FIG. 7-1, input text 753 has been input into a message generation window 754. The audio content application has identified portions 756-1, 756-2 of the input text 753 matching audio content items. In FIG. 7-2, the audio content application has generated a first message 732-1. The first message 732-1 includes the input text 753 from FIG. 7-1 and identifiers for the audio content items matching the identified portions 756-1, 756-2.

In some embodiments, the audio content application may preview the first message 732-1 prior to sending the first message 732-1. The preview of the message may display the message as the receiving device will present the message. In this manner, previewing the first message 732-1 may allow the user to review the message. If the user wishes to edit the message, the user may return to the message generation screen shown in FIG. 7-1 and edit the input text 753 and/or the selection of identified portions 756-1, 756-2 of the input text 753.

As may be seen in FIG. 7-2, the first identified portion 756-1 may be replaced with a first image content item 764-1 and an audio content item played over speakers 762. Thus, during the preview, the image content item 764 may be displayed while the audio content item is being played over the speakers 762. Furthermore, as discussed above, the first message 732-1 may be displayed sequentially. Thus, a first portion 760-1 including text content ("Let's have a") may be presented first. A second portion 760-2, including the first image content item 764-1 and audio content item played over the speaker 762 may be presented second. FIG. 7-3 shows a third portion 760-3 (text content "to"), a fourth portion 760-4 (image content item 764-2 and audio content item played over speaker 762), and a fifth portion 760-5 (text content "!"), presented sequentially.

In FIG. 7-4, the audio content application has received a second message 732-2. The audio content application may display the second message 732-2 sequentially. In other words, the audio content application may display a first portion 766-1 of the second message 732-2 first. In the embodiment shown, the first portion 766-1 of the second message 732-2 includes a "thumbs up" image and may be accompanied by an audio content item, such as a tone that increases from low to high. The second portion 766-2 of the second message 732-2 includes a "lightbulb" image," and may be accompanied by an audio content item, such as the sound of a bell being rung. The sender of the second message 732-2 may have intended the second message to communicate that a party is a "good idea." In this manner, the conversation may continue indefinitely through multiple sessions of sending and receiving messages.

Figure 8:
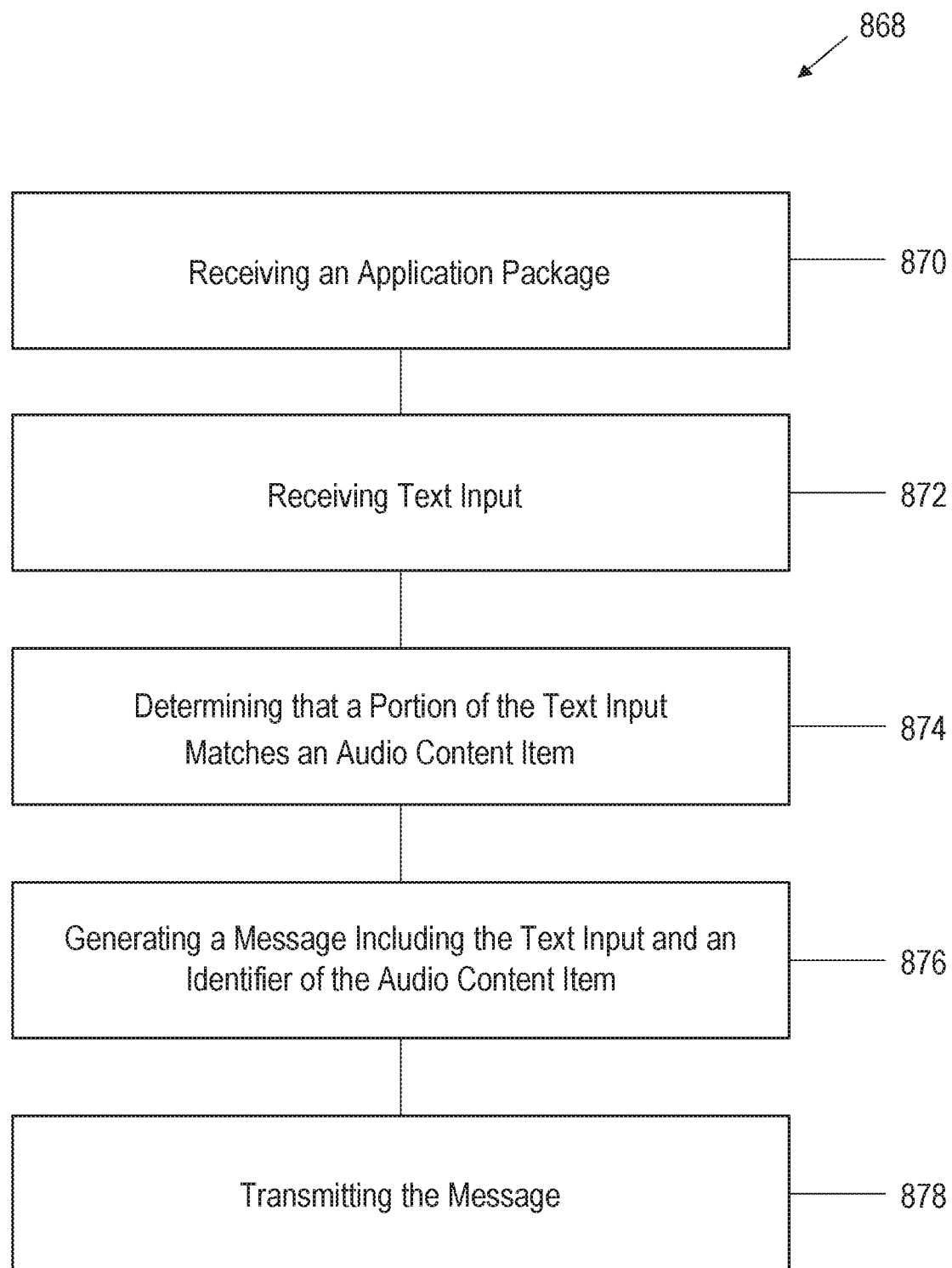
FIG. 8 illustrates a flow diagram of an example method for communication in accordance with one or more embodiments.
Figure 9:
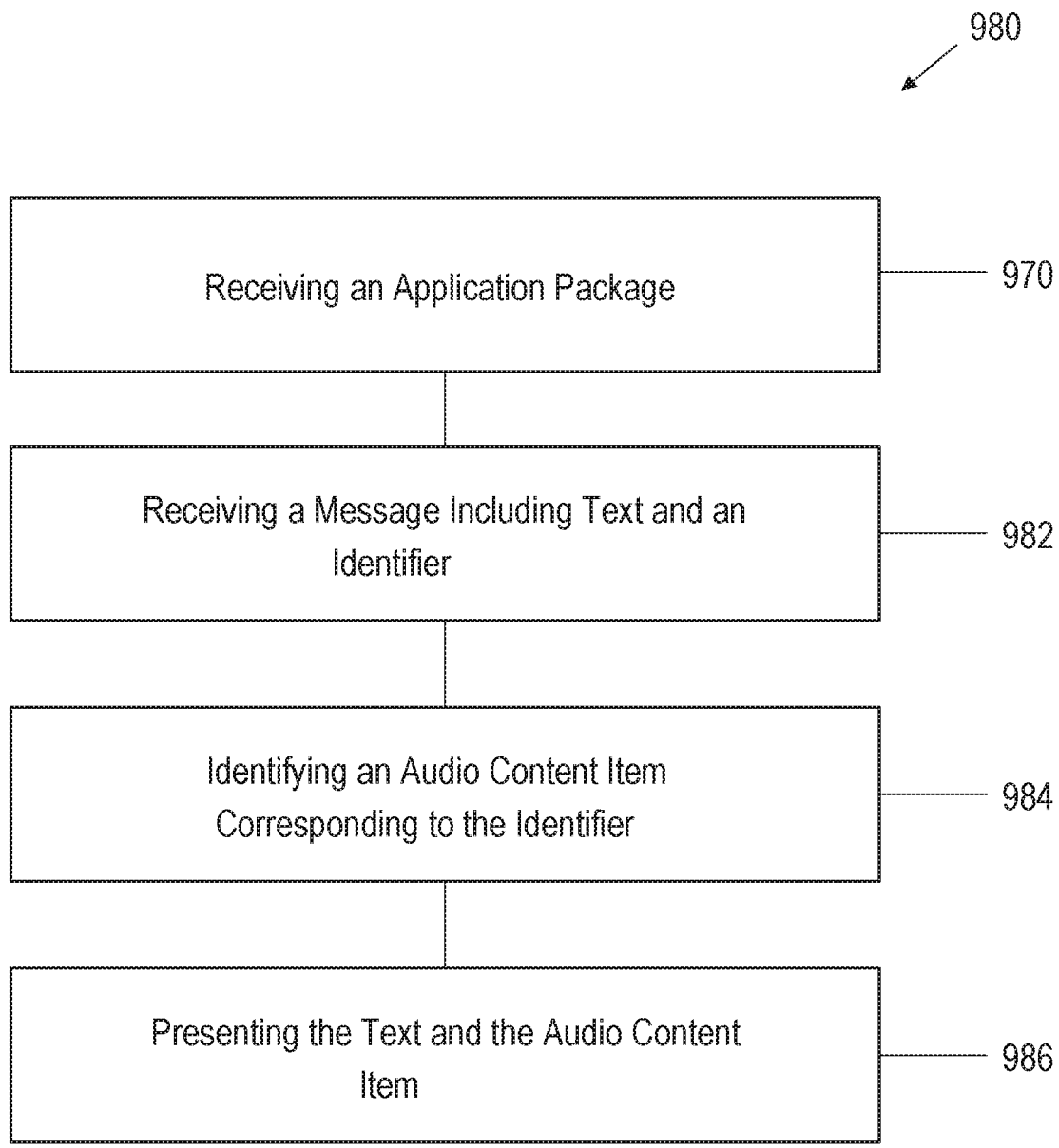
FIG. 9 illustrates a flow diagram of another example method for communication in accordance with one or more embodiments.

FIG. 8 and FIG. 9, the corresponding text, and the examples provide a number of different methods, systems, devices, and non-transitory computer-readable media of the audio content communication systems. In addition to the foregoing, one or more embodiments can also be described in terms of flowcharts comprising acts for accomplishing a particular result, as shown in FIG. 8 and FIG. 9. These figures may be performed with more or fewer acts. Further, the acts may be performed in differing orders. Additionally, the acts described herein may be repeated or performed in parallel with one another or parallel with different instances of the same or similar acts.

FIG. 8 is a representation of a method 868 for communication, according to at least one embodiment of the present disclosure. The method 868 includes receiving on a first client device an application package at 870. The application package may be received from an application server. The application package may include a plurality of audio content items and mapping data associated with one or more text strings.

The method 868 may further include receiving input text at 872 and determining that a portion of the text input matches an audio content item of the plurality of audio content items at 874. The portion of the text input may be matched using the mapping data from the application package. In some embodiments, the portion of the text input may be matched with an image content item. In some embodiments, a message may be generated at 876. The message may include the text input and an identifier of the audio content item. In some embodiments, generating the message may include replacing the portion of the text input with the audio content item. The message may be transmitted to a second device at 878. In some embodiments, the message may not include the audio content item. In some embodiments, as described herein, the message may be transmitted to the second device through a message server (see FIG. 4 and the associated description). In some embodiments, the message may be transmitted directly from the first client device to the second client device, without transferring through the message server. In some embodiments, a sending client device may transmit the message to a receiving client device through either or both a message server or directly to the receiving client device.

FIG. 9 is a representation of a method 980 for communication, according to at least one embodiment of the present disclosure. The method 980 includes receiving on a first client device an application package at 970. The application package may be received from an application server. The application package may include a plurality of audio content items and mapping data associated with one or more text strings. In some embodiments, the method 980 includes receiving a message including text and an identifier of an audio content item of the plurality of audio content items at 982. The audio content item corresponding to the identifier may be identified, from the received application package at 984. The method 986 may further include presenting the text and the audio content item at 986.

Figure 10:
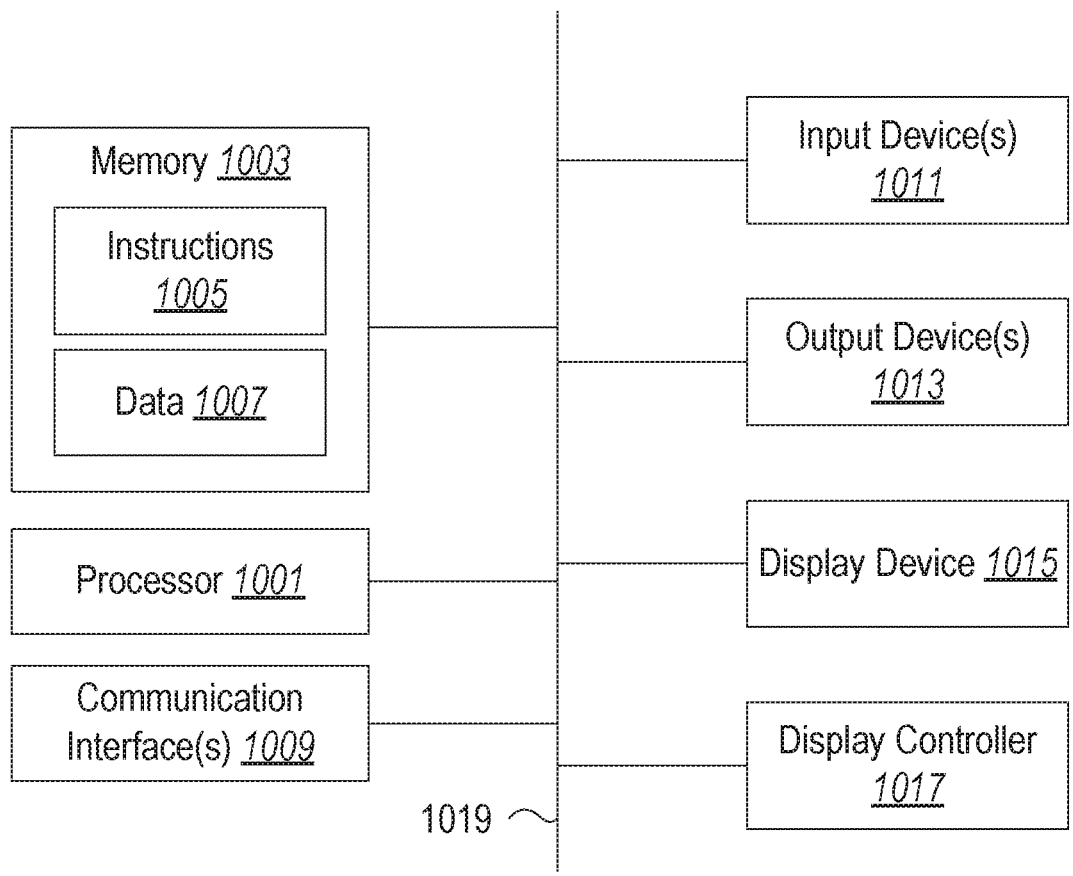
FIG. 10 illustrates a block diagram of an example computing device for implementing one or more embodiments of the present disclosure.

FIG. 10 illustrates certain components that may be included within a computer system 1019. One or more computer systems 1019 may be used to implement the various devices, components, and systems described herein.

The computer system 1019 includes a processor 1001. The processor 1001 may be a general-purpose single or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 1001 may be referred to as a central processing unit (CPU). Although just a single processor 1001 is shown in the computer system 1019 of FIG. 10, in an alternative configuration, a combination of processors (e.g., an ARM and DSP) could be used.

The computer system 1019 also includes memory 1003 in electronic communication with the processor 1001. The memory 1003 may be any electronic component capable of storing electronic information. For example, the memory 1003 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 1005 and data 1007 may be stored in the memory 1003. The instructions 1005 may be executable by the processor 1001 to implement some or all of the functionality disclosed herein. Executing the instructions 1005 may involve the use of the data 1007 that is stored in the memory 1003. Any of the various examples of modules and components described herein may be implemented, partially or wholly, as instructions 1005 stored in memory 1003 and executed by the processor 1001. Any of the various examples of data described herein may be among the data 1007 that is stored in memory 1003 and used during execution of the instructions 1005 by the processor 1001.

A computer system 1019 may also include one or more communication interfaces 1009 for communicating with other electronic devices. The communication interface(s) 1009 may be based on wired communication technology, wireless communication technology, or both. Some examples of communication interfaces 1009 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 1019 may also include one or more input devices 1011 and one or more output devices 1013. Some examples of input devices 1011 include a keyboard, mouse, microphone, remote control device, button, joystick, trackball, touchpad, and lightpen. Some examples of output devices 1013 include a speaker and a printer. One specific type of output device that is typically included in a computer system 1019 is a display device 1015. Display devices 1015 used with embodiments disclosed herein may utilize any suitable image projection technology, such as liquid crystal display (LCD), light-emitting diode (LED), gas plasma, electroluminescence, or the like. A display controller 1017 may also be provided, for converting data 1007 stored in the memory 1003 into text, graphics, and/or moving images (as appropriate) shown on the display device 1015.

The various components of the computer system 1019 may be coupled together by one or more buses, which may include a power bus, a control signal bus, a status signal bus, a data bus, etc. For the sake of clarity, the various buses are illustrated in FIG. 10 as a bus system 819.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for communication, comprising:
   receiving, at a first client device from an application server, an application package including a plurality of audio content items and mapping data associating the plurality of audio content items with a plurality of text strings;
   receiving, at the first client device, a text input;

determining that a portion of the text input matches an audio content item of the plurality of audio content items based on the mapping data indicating a text string from the plurality of text strings being associated with the audio content item;

generating a message package including the text input and an identifier of the audio content item of the plurality of audio content items, the identifier of the audio content item being added to the message based on determining that the portion of the text input matches the audio content item; and transmitting the message package to a second client device, wherein transmitting the second message package to the second client device causes the second client device to present a message based on the message package, wherein the message includes a first part and a second part, wherein the first part includes at least a portion of the text input and the second part includes an image associated with the audio content item, wherein the first part and the second part are presented sequentially within a single bubble at the same time on a display of the second client device, wherein the audio content item is presented with the image associated with the audio content item, wherein one of the first part or the second part is presented before the other of the first part or the second part is presented, wherein presentation of the first part and the second part is separated by a delay.

2. The method of claim 1, wherein transmitting the message to the second client device includes transmitting the text input and the identifier of the audio content item without transmitting the audio content item.

3. The method of claim 1, wherein the application package includes a plurality of image content items, and wherein the mapping data associates the plurality of audio content items with the plurality of image content items.

4. The method of claim 3, wherein determining that the portion of the text input matches the audio content item includes determining that the portion of the text input matches with an image content item from the plurality of image content items.

5. The method of claim 1, further comprising presenting text input and the audio content item on the first client device, wherein presenting the text input and the audio content item includes replacing the portion of the text input with the identifier of the audio content item.

6. The method of claim 5, wherein replacing the portion of the text input includes replacing the portion of the text input with an image content item and the audio content item.

7. The method of claim 1, further comprising:
providing, to an authentication server, authentication information associated with the first client device, wherein providing the authentication information to the authentication server causes the authentication server to:
authenticate a first identity of the first client device;
establish a message identity for the message based on the identity of the first client device and a second identity of a second client device previously authenticated by the authentication server.

8. The method of claim 7, wherein the message is stored on a message server based on the message identity.

9. The method of claim 1, wherein the portion of text input is presented one word at a time on the second client device.

10. The method of claim 1, wherein the application package causes the plurality of audio content items to be stored on the same directory path on the first client device and the second client device.

11. A method for communication, comprising:
receiving at a client device, from an application server, an application package including a plurality of audio content items and mapping data associating the plurality of audio content items with a plurality of text strings;
receiving a message including:
a first part including at least a first portion of a text input; and
an identifier of an audio content item of the plurality of audio content items, the identifier of the audio content item being associated with a portion of text from the text input within the message based on the mapping data;
identifying, from the received application package, the audio content item corresponding to the identifier; and
presenting the first part, a second part of the message, and the audio content item, wherein the second part of the message includes an image associated with the audio content item, wherein the first part and the second part are presented in sequential order such that one of the first part or the second part is presented before the other of the first part or the second part, wherein the audio content item is presented with the second part, wherein the sequential order is based on an order within the message of the text input, wherein, after the first part and the second part are presented, the first part and the second part are displayed in a single bubble at the same time on a display of the client device.

12. The method of claim 11, wherein presenting the text input and the audio content item comprises:
displaying the text input via a graphical user interface of the client device; and
presenting the audio content item via a speaker of the client device and after displaying the text input.

13. The method of claim 11, wherein the audio content item is a first audio content item, the message is a first message, the text input is a first text input, the identifier is a first identifier, and the client device is a first client device, and further comprising:
receiving a second text input on the first client device;
determining that a portion of the second text input matches a second audio content item of the plurality of audio content items based on the mapping data indicating a text string from the second text input being associated with the second audio content item;
generating a second message including the text input and a second identifier of the second audio content item; and
transmitting the message to a second client device.

14. The method of claim 11, wherein the audio content item is a first audio content item, and wherein the message additionally includes a second identifier of a second audio content item, the method further comprising:
identifying, from the received application package, a second audio content item corresponding to the second identifier; and
wherein presenting the message includes presenting the second audio content item after at least one of the text input or the first audio content item has completed presenting.

15. The method of claim 14, wherein presenting the second audio content item in conjunction with the text input and the first audio content item comprises presenting the audio content item and the second audio content item in a time sequence based on locations of associated portions of the text input corresponding to each of the first audio content item and the second audio content item, the time sequence including a delay between each portion of the message.

16. A system for communication, comprising:
one or more processors;
a memory in electronic communication with the one or more processors;
instructions stored in the memory, the instructions being executable by the one or more processors to:
receive from an application server an application package including a plurality of audio content items, the application package including instructions to create an audio content directory in the memory, the audio content directory including the plurality of audio content items and a plurality of descriptive text items associated with the plurality of audio content items, wherein the audio content item is in the same location on multiple client devices, the mapping data associating the plurality of audio content items with the plurality of descriptive text items;
receive a text input;
determine that a portion of the text input matches a descriptive text item from the plurality of descriptive text items, the descriptive text item being associated with an audio content item of the plurality of audio content items based on the mapping data;
generate a message including the text input and an identifier of the audio content item of the plurality of audio content items, the identifier of the audio content item being added to the message based on determining that the portion of the text input matches the descriptive text item, the identifier identifying a location of the audio content item in the audio content directory, wherein the identifier identifies the same directory path on the multiple client devices; and
transmit the message to a second client device.

17. The system of claim 16, wherein the audio content item is a first audio content item, the message is a first message, the identifier is a first identifier, and the computing device is a first computing device, and wherein the instructions further cause the processor to:
receive text input on the computing device;
determine that a portion of the text input matches a second audio content item of the plurality of audio content items based on the mapping data;
generate a second message including the text input and a second identifier of the second audio content item; and
transmit the message to a second computing device.

18. The system of claim 16, wherein the instructions to transmit the message to the second computing device further cause the processor to transmit the text input and the identifier of the audio content item without the audio content item.

19. The system of claim 16, further comprising instructions being executable to:
determine that a second portion of the text input matches a second audio content item of the plurality of content items,
wherein generating the message further comprises including a second identifier of the audio content item within the message.

20. The system of claim 16, wherein a second client device of the multiple client devices locates the audio content item on the same directory path without searching for the audio content item.

* * * * *